United States Patent
Nakayama et al.

(10) Patent No.: US 8,585,791 B2
(45) Date of Patent: Nov. 19, 2013

(54) METHOD OF PRODUCING NODULAR SILICA SOL

(75) Inventors: Kazuhiro Nakayama, Kitakyushu (JP);
Akira Nakashima, Kitakyushu (JP);
Hiroyasu Nishida, Kitakyushu (JP);
Yoshinori Wakamiya, Kitakyushu (JP)

(73) Assignee: JGC Catalysts and Chemicals Ltd., Kawasaki-Shi (JP)

( * ) Notice: Subject to any disclaimer, the term of this patent is extended or adjusted under 35 U.S.C. 154(b) by 0 days.

(21) Appl. No.: 13/137,661

(22) Filed: Sep. 1, 2011

(65) Prior Publication Data

US 2011/0314745 A1 Dec. 29, 2011

Related U.S. Application Data

(63) Continuation of application No. 11/990,111, filed as application No. PCT/JP2006/315181 on Aug. 1, 2006, now abandoned.

(30) Foreign Application Priority Data

Aug. 10, 2005 (JP) ................................. 2005-231465
Sep. 1, 2005 (JP) ................................. 2005-254054

(51) Int. Cl.
*C09K 3/14* (2006.01)

(52) U.S. Cl.
USPC .............................................. 51/298; 51/308

(58) Field of Classification Search
USPC .................................................... 51/298, 308
See application file for complete search history.

(56) References Cited

U.S. PATENT DOCUMENTS

| 5,221,497 A | * | 6/1993 | Watanabe et al. ............... 516/83 |
| 2003/0061766 A1 | * | 4/2003 | Vogt et al. ........................ 51/308 |

FOREIGN PATENT DOCUMENTS

| JP | 63045113 A | * | 2/1988 | ............. C01B 33/14 |
| JP | 63045114 A | * | 2/1988 | ............ C01B 33/143 |
| JP | 63064911 A | * | 3/1988 | ............ C01B 33/141 |

* cited by examiner

*Primary Examiner* — Kaj K Olsen
*Assistant Examiner* — Ross J Christie
(74) *Attorney, Agent, or Firm* — Manabu Kanesaka

(57) ABSTRACT

In producing nodular silica sol, a polymerized silicic acid solution with viscosity of silicic acid from 0.9 to 100 mPa·s is prepared by aging a silicic acid solution with pH from 1.0 to 7.0 and silica concentration from 0.05 to 3.0% by weight at a temperature from 1 to 98° C. Then, a seed liquid is prepared by adding an alkali to the polymerized solution to adjust the pH from 10 to 12.5 and heating the resultant mixture solution at a temperature from 50 to 150° C. According to necessity, an alkali is added to the obtained seed liquid to adjust the pH in from 9 to 12.5. Finally, a silicic acid solution or a highly purified silicic acid solution is dropped to the seed liquid at a temperature from 20 to 98° C. continuously or intermittently for building up.

13 Claims, No Drawings

METHOD OF PRODUCING NODULAR SILICA SOL

CROSS-REFERENCE TO RELATED APPLICATION

This is a continuation application of Ser. No. 11/990,111, filed on Feb. 7, 2008.

FIELD OF THE INVENTION

The present invention relates to a method of producing a nodular silica sol which is a preferable polishing material.

BACKGROUND OF THE INVENTION

In production of substrates each with a semiconductor integrated circuit thereon, irregularities or steps are generated when a circuit is formed on a silicon wafer with metal such as copper, and therefore metal portions of the circuit are preferentially removed by polishing to remove the irregularities or steps in a surface. Furthermore, irregularities are generated when aluminum wiring is provided on a silicon wafer and an oxide film of silica or the like as an insulating film is provided, and the irregularities are averaged by polishing the oxide film. In the process of polishing a substrate as described above, it is generally required that the polished surface does not include any step nor irregularity and is flat and smooth without any micro blemish or the like, and that the polishing speed is high.

Recently, in association with the needs for size reduction and higher performance of electric and electronic products, a degree of integrated in semiconductor devices has been becoming increasingly higher, but, for instance, when there remain impurities such as Na or K in a separating layer of a transistor, the desired performance may not be realized or some failures may occur. Especially, when Na is deposited on a surface of a polished semiconductor substrate or of an oxide film, Na having high dispersibility may be trapped in defects of the oxide film or the like. In this case, even when a circuit is formed on the semiconductor substrate, sometimes an insulation failure or a short circuit may occur, and furthermore the dielectric constant may drop. Because of the tendency, under some conditions for use of the semiconductor substrate, or when the semiconductor substrate is used for a long time, the failures as described above may occur, so that there is a strong need for development of a polishing material containing little impurities such as Na or K.

As particles for polishing, such materials as a silica sol, fumed silica, and fumed alumina are generally used.

A polishing material used in the CMP technique generally includes spherical particles for polishing with the average diameter of around 200 nm made of a metal oxide such as silica or alumina, an oxidizing reagent for raising an operational speed in polishing metal material for wiring or circuits, and additive such as an organic acid, and solvent such as deionized water. Since there are steps (irregularities) caused by a trench pattern for wiring formed on the base insulating film on a surface of a polished material, the surface is polished down to the common plane by mainly removing the convex portions to provide a flat polished surface. With the spherical particles as described above, however, when a portion above the common plane is polished, the metal for a circuit within a wiring trench under concave sections may disadvantageously be polished down to a level under the common plane, and the problem is generally referred to as dishing. When the dishing (excessive polishing) as described above occurs, there occur such problems as that a thickness of the wiring diminishes and the wiring resistance becomes larger, or that the flatness of an insulating film formed on the polished surface becomes lower, so that there is the need for suppressing the dishing.

When a polishing material containing a group of nodular particles is used for polishing a substrate having the irregularities as described above, concave portions on a surface of the substrate are prevented from being polished until upper end faces of the convex portions are polished to the same level as bottom faces of the concave portions. After the upper end faces of the convex portions are polished down to the same level as the bottom faces of the concave portions, both the convex portions and the concave portions can be polished at the same polishing speed, the dishing (excessive polishing) never occurs, and the polished surface has no irregularities and is excellent in the flatness as well known. Since the dishing never occurs in a polishing process performed, for instance, when forming a semiconductor integrated circuit, increase of a circuit resistance in the obtained integrated circuit does not occur, and the polished surface is excellent in the flatness, so that a laminated integrated circuit can efficiently be formed.

Applications of the polishing material containing the nodular particles as described above expectedly include, but not limited to mirror machining of aluminum wiring on a aluminum disk (aluminum or a metal skin over the substrate) or on a semiconductor multilayered wiring substrate, a glass substrate for an optical disk or a magnetic disk, a glass substrate for a liquid crystal display, a glass substrate for a photo mask, and other glass materials.

As a method of producing a silica sol containing nodular particles, for instance, Japanese Patent Laid-Open Publication No. HEI 4-187512 (Patent document 1) discloses the method in which a silicic acid solution is added to an aqueous solution of an alkali metal silicate with the concentration in the range from 0.05 to 5.0 weight % when calculated as $SiO_2$ so that the $SiO_2/M_2O$ (molar ratio, wherein M denotes an alkali metal or quarternary ammonium) in the mixture solution is in the range from 30 to 60, and then one or more metal compounds selected from the group consisting of Ca, Mg, Al, In, Ti, Zr, Sn, Si, Sb, Fe, Cu and rare earth metals are added to the mixture solution (before or during the process of adding the silicic acid solution), the resultant mixture solution is maintained at a temperature of 60° C. or more for a certain period of time, and furthermore a silicic acid solution is added to the mixture solution so that $SiO_2/M_2O$ (molar ratio) is in the range from 60 to 100 to obtain a sol in which nodular silica particles are substantially dispersed.

Japanese Patent Laid-Open Publication No. HEI 7-118008 (Patent document 2) discloses a method of producing a silica sol of particles having a slender form in which water-soluble calcium salt, magnesium salt, or an aqueous solution of the compounds is added to a colloidal solution of active silicic acid, an alkali substance is added to the resultant aqueous solution, a portion of the obtained mixture is heated to 60° C. or more to obtain a heal liquid, a remaining portion of the mixture is used as a feed liquid, the feed liquid is added to the heal liquid, and the mixture solution is condensed to the $SiO_2$ concentration in the range from 6 to 30 weight % by evaporating water during the adding process to obtain a silica sol having a slender form.

Japanese Patent Laid-Open Publication No. 2001-11433 (Patent document 3) discloses a method of a silica sol of particles having a beads-like form in which an aqueous solution containing either one or both of an water-soluble bivalent and tervalent metal salts is added to a colloidal solution of active silicic acid including the active silica by 0.5 to 10 weight % as calculated as $SiO_2$ with the pH of 2 to 6 so that a molar ration of the metal compound (expressed as MO in a case of a bivalent metal salt and as $M_2O_3$ in a case of a tervalent metal salt, wherein M denotes a bivalent or tervalent metal atom, and O denotes a oxygen atom) against $SiO_2$ in the colloidal solution of the active silicic acid is in the range from 1 to 10 weight %, the resultant mixture solution is well agitated to obtain a mixture solution (1), an acidic and spherical silica sol with the average diameter in the range from 10 to 120 nm and pH in the range from 2 to 6 is added to the mixture solution (1) so that a ratio (weight base) of a content (A) of silica originated from the acidic spherical silica sol against a content (B) of silica originated from the mixture solution is in the range from 5 to 100 and at the same time so that a total silica content (A+B) as calculated as the $SiO_2$ concentration in a mixture solution (2) obtained by mixing the acidic spherical silica sol with the mixture solution (1) is in the range from 5 to 40 weight %, an alkali metal hydrate or the like is added to the mixture solution (2) to adjust the pH to 7 to 11, and a resultant mixture solution (3) is heated at a temperature in the range from 100 to 200° C. for 5 to 50 hours.

Japanese Patent Laid-Open Publication No. 2001-48520 (Patent document 4) discloses a method of silica sol in which alkyl silicate with the silica concentration in the range from 1 to 8 mol/liter, the acid concentration in the range from 0.0018 to 0.18 mol/liter, and water concentration in the range from 2 to 30 mol/liter is hydrolyzed with acid catalyst, the product is diluted with water so that the silica concentration is in the range from 0.2 to 1.5 mol/liter, and then alkali catalyst is added to the diluted solution to adjust the pH to 7 or more, the solution is heated to advance polymerization of the silicic acid to obtain a silica sol in which slender non-crystalline silica particles having the average diameter in the sideward direction in the range from 5 to 100 nm and that in the longitudinal direction in the range from 1.5 to 50 times of the sideward direction above when observed with an electron microscope are dispersed in the liquid dispersing element.

Japanese Patent Laid-Open Publication No. 2001-150334 (Patent document 5) discloses a method of producing a silica sol of distorted particles in which a salt of an alkali earth metal such as Ca, Mg, Ba is added in an acidic aqueous solution of active silicic acid with the $SiO_2$ density in the range from 2 to 6 weight % obtained by subjecting an aqueous solution of an alkali metal silicate such as water glass to the processing for removing cation at the weight ration of the salt as calculated as an oxide thereon against $SiO_2$ in the acidic silicic acid in the range from 100 to 1500 ppm, furthermore the alkali material is added to this solution so that the $SiO_2/M_2O$ molar ratio (wherein M denotes an alkali metal atom, $NH_4$, or a quarternary ammonium group) is in the range from 20 to 150 to obtain an initial heal liquid, an aqueous solution of active silicic acid obtained in the same way as that described above and having the $SiO_2$ concentration in the range from 2 to 6 weight % and the $SiO_2/M_2O$ molar ratio (M denotes an alkali metal atom) in the range from 20 to 150 is used as a charge liquid, and the charge liquid is added to the initial heal liquid at the temperature in the range from 60 to 150° C. at a rate expressed as a weight ratio of $SiO_2$ in the charge liquid/$SiO_2$ in the initial heal liquid per hour in the range from 0.05 to 1.0 evaporating (or not evaporating) water from the solution to obtain a sol of distorted particles.

Japanese Patent Laid-Open Publication No. HEI 8-279480 (Patent document 6) describes that, in the colloidal silica aqueous solution prepared by the method (1) in which an alkali aqueous solution of silicic acid is neutralized with a mineral acid, then an alkali substance is added to the neutralized aqueous solution, and the mixed solution is heated for aging, by the method (2) in which an alkali substance is added to active silicic acid obtained by subjecting an aqueous solution to the cation exchange processing and the mixture solution is heated for aging, by the method (3) in which alkoxy silane such as ethyl silicate is hydrolyzed and the obtained active silicic acid is heated for aging, or by the method (4) in which fine powder of silica is directly dispersed in an aqueous medium, generally colloidal silica particles having the diameter in the range from 4 to 1,000 nm (nanometers), and more preferably in the range from 7 to 500 nm are dispersed in an aqueous medium, and that the concentration of $SiO_2$ is in the range from 0.5 to 50 weight % and more preferably in the range from 0.5 to 30 weight %. The document furthermore describes that forms of the silica particles includes a spherical form, an irregular form, a flat form, a plate-like form, a slender form, and a textile-like form.

Also in the case of the silica sol containing the nodular particles as described above, a high purity silica sol containing such impurities as Na or K as little as possible is required.

As a method of producing an aqueous silica sol with high purity, there is known a method using alkoxy silane containing few impurities as a starting material, and Japanese Patent Laid-Open Publication No. HEI 6-316407 (Patent document 7) discloses a method in which alkyl silicate is hydrolyzed in the presence of alkali and generated silicic acid is polymerized to obtain an aqueous silica sol. Also Japanese Patent Laid-Open Publication No. 2001-2411 (Patent document 8) and other documents disclose a method in which alkoxy silane is hydrolyzed in an acidic solvent and the obtained silicic acid monomer is polymerized in a basic solvent to obtain an aqueous silica sol. In the methods described above, there are the several problems, for instance, that stability of the obtained aqueous silica is not sufficient, or that an alkoxy group (OR group) remains, the density of obtained particles is low, and therefore a sufficient polishing speed can not be obtained when the silica sol is used as a polishing material.

In the method using water glass obtained by dissolving cullet obtained by solving glass sand with an alkali in water as a starting material, an aqueous silica sol can be obtained, for instance, by dealkylating the water glass and polymerizing the obtained silicic acid solution (containing silicic acid monomers much) in a basic solvent.

However, since many types of metals such as Al, Ti, Fe, Mg, and Ca are contained as impurities in the glass sand, alkali metals (represented by Na) remain much in the obtained aqueous solution in proportion to an amount of the metal ions, so that the aqueous solution is not suited for use as a polishing material for a semiconductor substrate.

Such metals as Al and Na can be reduced to some extend by processing the aqueous solution with an acid or a chelating agent, but the purity is not sufficient as a polishing material for a semiconductor substrate. Also high purity silica powder is used in place of the glass sand, but the high purity silica is expensive, and it take disadvantageously long time in solving the high purity silica with an alkali.

Japanese Patent Laid-Open Publication No. SHO 61-58810 (Patent document 9) discloses a method in which an aqueous solution of alkaline silicate having a prespecified concentration is contacted to a strong acidic cation exchanger, then an acid is added, the mixture solution is subjected to ultrafiltration and is furthermore contacted to a anion exchanger as well as to a cation exchange, and then ammonium is added therein to grow particles.

Japanese Patent Laid-Open Publication No. HEI 5-85718 (Patent document 10) discloses a method of producing an aqueous solution with high purity comprising the steps of: (1) decationizing a diluted aqueous solution of water glass to obtain an aqueous solution of active silicic acid, (2) processing the solution of active silicic acid with a strong acid, (3) deionizing the aqueous solution of active silicic acid having been processed with the strong acid to obtain a solution of active silicic acid with high purity, (4) adding an alkali to the aqueous solution to obtain a stabilized aqueous solution of active silicic acid, (5) evaporating and condensing this aqueous solution to grow particles and obtain a silica sol of the particles with the average particle diameter in the range from 10 to 30 mμ, and (6) contacting this silica sol to ion exchange resin to obtain an aqueous silica sol with high purity. In this method, impurities are removed (leaching) by adding a strong acid in the stage of active silicic acid, but there is a problem concerning stability of the active silicic acid after leaching, which easily causes gelatination of the sol.

Japanese Patent Laid-Open Publication No. HEI 6-16414 (Patent document 11) discloses a method of producing a silica sol with high purity comprising the steps of: adding a strong acid or a salt of a strong acid to alkali metal silicate or to an aqueous solution of active silicic acid to obtain a mixture solution, processing the mixture solution with ion exchange resin, adding the solution obtained in the process described above to the solution obtained by means of ion exchanging to prepare a silica sol, processing the obtained silica sol with ion exchange resin, and adding ammonia to the obtained silica sol. Also in this method, there are the same problems like those recognized in the invention disclosed in the Japanese Patent Laid-Open Publication No. HEI 5-85718.

In the method disclosed in Japanese Patent Laid-Open Publication No. 2003-89786 (Patent document 12), a chelate type ion exchange resin and a chelating agent are used as metal ion capturing agents. In this invention, it is require at first to contact an aqueous solution of alkali silicate to strong acidic ion exchange resin for removing alkali metals in the alkali silicate to prepare an aqueous solution of active silicic acid from the aqueous solution of alkali silicate, and then to contact the solution to chelate resin to removing multivalent metal ions. Namely in this invention, ion exchange is performed through multiple steps, so that the production efficiency is disadvantageously low. In addition, the chelate type ion exchange resin has strong selectivity to tervalent ions, and it is difficult to reuse the resin repeatedly, and when it is tried to reuse the chelate type ion exchange resin, a large amount of reclaiming agent is disadvantageously required.

When a chelating agent is used to capture metal ions, it is necessary to repeat cleaning with a ultrafiltration film for removing the remaining chelating agent and the chelating agent having capture metal ions, so that the production efficiency is rather low, and even when cleaning is repeated, it is difficult to completely remove the chelating agent, and the remaining chelating agent may give negative effects to the polishing performance.

Patent document 1: Japanese Patent Laid-Open Publication No. HEI 4-187512
Patent document 2: Japanese Patent Laid-Open Publication No. HEI 7-118008
Patent document 3: Japanese Patent Laid-Open Publication No. 2001-11433
Patent document 4: Japanese Patent Laid-Open Publication No. 2001-48520
Patent document 5: Japanese Patent Laid-Open Publication No. 2001-150334
Patent document 6: Japanese Patent Laid-Open Publication No. HEI 8-279480
Patent document 7: Japanese Patent Laid-Open Publication No. HEI 6-316407
Patent document 8: Japanese Patent Laid-Open Publication No. 2001-2411
Patent document 9: Japanese Patent Laid-Open Publication No. SHO 61-158810
Patent document 10: Japanese Patent Laid-Open Publication No. HEI 5-85718
Patent document 11: Japanese Patent Laid-Open Publication No. HEI 6-16414
Patent document 12: Japanese Patent Laid-Open Publication No. 2003-89786

DISCLOSURE OF THE INVENTION

The present invention relates to a novel nodular silica sol adapted to use as a polishing material for polishing, for instance, CMP, a silicon substrate, an aluminum substrate, a silica substrate, a metal oxide substrate, or a glass substrate.

The present invention also related to a method of producing a nodular silica sol adapted for use as a polishing material for polishing, for instance, CMP, a silicon substrate, an aluminum substrate, or a glass substrate. In this method, silicic acid contained in a silicic acid solution as a feed is polymerized to a preferable level of viscosity and is heated in the presence of alkali, and is furthermore built up. Alternatively salts are removed from a silica hydrogel obtained by neutralizing the silicate with an acid, and then an alkali is added to the silica hydrogel to adjust a molar ratio of $SiO_2/M_2O$ (M: Na, K, $NH_3$), then the mixture is heated to prepare and build up a seed sol in the alkali zone.

An object of the present invention is to enable production of a nodular silica sol with high purity extremely little containing impurities such as Na, K, Cl, Cu, Ni, and Fe by combining a step of producing the nodular silica sol with a step of improving purity of the silica sol.

The nodular silica sol according to the present invention is a nodular silica sol having a ratio of an average particle diameter (r) obtained through measurement by means of the dynamic light scattering method versus a particle diameter (r') converted to that of an equivalent sphere computed from an average specific surface area measured by means of the nitrogen absorption method (r/r', referred to as "association ratio") in a range from 1.2 to 10, the particle diameter (r') in a range from 5 to 200 nm, and the specific surface area in a range from 13 to 550 $m^2/g$, in which nodular silica particles having heterogeneous forms are dispersed in a solvent. Contents of Ca and Mg contained in the nodular silica particles, when calculated as those of the oxides, are below 1000 ppm against $SiO_2$ respectively.

The nodular silica particles do not contain carbon.

In the nodular silica sol according to the present invention, percentages of Na, K, Cu, Ni, and Fe contained in the highly purified nodular silica sol against $SiO_2$ are 10 ppm or below, 10 ppm or below, 500 ppb or below, 300 ppb or below, and 150 ppm or below respectively.

In a method of producing nodular silica sol according to a first embodiment of the present invention, a silicic acid solution with pH in a range from 1.0 to 7.0 and silica concentration in a range from 0.05 to 3.0 weight % is aged at a temperature in a range from 1 to 98° C. to prepare a polymerized silicic acid solution with viscosity of silicic acid in a range form 0.9 to 100 mPa·s, and then an alkali is added to the polymerized silicic acid solution, the mixture solution is heated to prepare a seed liquid, and then the obtained seed liquid is built up.

Alternatively, in the method for producing nodular silica sol according to the first embodiment of the present invention, a silicic acid solution with pH in a range from 1.0 to 7.0 and silica concentration in a range from 0.05 to 3.0 weight % is aged at a temperature in a range from 1 to 98° C. to prepare a polymerized silicic acid solution with viscosity of a silicic acid in a range form 0.9 to 100 mPa·s, and then an alkali is added to the polymerized silicic acid solution so that the pH is adjusted to a range from 9 to 12.5, the mixture solution is heated at a temperature in a range from 50 to 150° C. to prepare a seed liquid, an alkali is added to the obtained seed liquid according to the necessity so that the pH is adjusted to a range from 9 to 12.5, and then a silicic acid solution or a highly purified silicic acid solution is continuously or intermittently dropped into the seed liquid for building up particles.

Preferably an alkali or an acid is added to the silicic acid solution so that the pH is adjusted to a range from 1.0 to 7.0.

The highly purified nodular silica sol is preferably produced by the method of producing a nodular silica sol described above, and in that case, a highly purified silicic acid solution prepared by separately contacting a strong acidic cation exchanger and a strong basic anion exchanger to a silicic acid solution is used for built-up.

Preferably the highly purified nodular silica sol is obtained by further contacting the highly purifying the nodular silica sol prepared by the production method to a cation exchanger and then to an anion exchanger.

The nodular silica sol according to the present invention has an average particle diameter (r) measured by the dynamic light scattering method in a range from 10 to 200 nm, a specific surface area in a range from 30 to 300 $m^2/g$, and an association ratio in a range from 1.2 to less than 2.7, and is adapted for use as a silica sol for polishing.

Of the nodular silica sols according to the present invention, especially preferable are those in which silica particles having the association ratio (r/r') in a range from 1.2 to 4.0 and an average particle diameter (r) measured by the dynamic light scattering method in a range from 10 to 150 nm are dispersed and an absolute value of a difference between zeta potentials at pH 5 and at pH 9 is in a range from 1 to 9 mV.

A method of producing a nodular silica sol according to a second embodiment of the present invention includes the steps (1) and (2) described below.

(step 1): A silica hydrogel obtained by neutralizing a silicate with an acid is cleaned to remove salts, an alkali is added so that molar ratio of $SiO_2/M_2O$ (M: Na, K, $NH_3$) is adjusted to a range from 30 to 500, and then the mixture is heated at a temperature in a range from 60 to 200° C. to obtain a silica sol.

(Step 2): The silica sol described above is used as a seed sol, and an alkali is added to the seed sol according to the necessity. Then a silicic acid solution is continuously or intermittently added to the mixture at pH in a range from 9 to 12.5 and at a temperature in a range from 60 to 200° C.

The silicate is preferably selected from a group consisting of sodium silicate, potassium silicate, and ammonium silicate.

The seed sol in the step (2) is preferably a sol in which silica particles having an average diameter in a range from 5 to 80 nm when measured by the dynamic light scattering method are dispersed.

The silicic acid solution in the step (2) is preferably an acidic silicic acid solution obtained by dealkylating an alkali silicate.

In the production method according to the second embodiment, preferably the silicic acid solution is highly purified.

The nodular silica sol obtained by the production method according to the second embodiment is preferably to be further purified.

The nodular silica sol can be used as a component of a polishing material.

With the production method according to the present invention, now it is possible to easily obtain a nodular silica sol of particles having heterogeneous forms. When the nodular silica sol as described above is used as a polishing material, an excellent polishing performance is provided. Furthermore, with another production method according to the present invention, it is possible to obtain a highly purified nodular silica sol of particles having heterogeneous forms containing only an extremely small amount of impurities.

With the method of producing a nodular silica sol according to the present invention, it is possible to produce a nodular silica sol capable of achieving excellent polishing performance when applied to polishing, and different from the conventional technique, addition of a calcium salt or a magnesium salt is not required, so that operations for removing the added materials are not necessary, and a nodular silica sol can be obtained more easily as compared to the conventional techniques.

BEST MODE FOR CARRYING OUT THE INVENTION

Nodular Silica Sol

The nodular silica sol according to the present invention has largely the following two features, and the features are provided by the methods of producing the nodular silica sol. In the nodular silica sol according to the present invention, forms of the silica particles dispersed in the solvent is not homogeneous, and nodular silica particles having heterogeneous forms are dispersed in the solvent, which is a first feature of the present invention. The nodular silica particles according to the present invention have various forms including a column form, an egg-like form, a branched form, and the like.

The nodular silica sol particles as described above have a ratio of a average particle diameter (r) obtained through measurement by means of the dynamic light scattering method versus a particle diameter (r') converted to that of an equivalent sphere computed from an average specific surface area (r/r', referred to as "association ratio") in the range from 1.2 to 10. When the association ratio is less than 1.2, the particles have extremely spheric forms, and when the particles are used for polishing, sometimes a sufficient polishing rate can not be obtained. On the other hand, when the association ratio is over 10, the polishing performance may drop.

The average particle diameter (r) by means of a dynamic light scattering method is usually measured by particle diameter distribution measuring devices using dynamic light scattering method.

The average particle diameter (r') calculated from a specific surface area measured by means of the BET method is obtained as described below. At first silica sol is dried with a freeze-drying machine, and then the sample is dried at 110° C. for 16 hours. After the specific surface area is measured, the average particle diameter is measured with a specific surface area measuring device (produced by Yuasa Ionics Corp., Multisorp 12) by means of the nitrogen absorption method (BET method). A specific surface area (SA) is obtained from the amount of absorbed nitrogen measured by the BET method, and then r' is calculated through the equation of particle diameter (r')=6000/(SA×Density), when it supposes that the density of silica equals to 2.2.

A second feature of the nodular silica particles is that a content of Ca or Mg contained in the nodular silica sol (based on an oxide thereof) is 1000 ppm or below against $SiO_2$, namely that there is substantially no carbon atom contained therein. The content of Ca or Mg against $SiO_2$ (based on an oxide thereof) is preferably 500 ppm or below.

The particle diameter (r') converted to that of an equivalent sphere computed from an average specific surface area measured by the nitrogen absorption method according to the present invention is preferably in the range from 5 to 200 nm. The specific surface area (measured by the nitrogen absorption method) is preferably in a range from 13 to 550 $m^2/g$.

When the average particle diameter is less than 5 nm, even if the particles are used as a polishing material, sometimes a sufficient polishing speed can not be obtained. On the other hand, when the average particle diameter is more than 200 nm, even if the particles are used for polishing in the state of silica sol, sometimes an amount of polishing particles per unit volume may be insufficient, and the sufficient polishing performance may not be obtained. The average particle diameter is more preferably in the range from 10 to 150 nm.

Nodular silica sol highly purified advantageously be used as the nodular silica sol according to the present invention. The highly purified nodular silica sol as described above satisfies the requirement for the nodular silica sol as described above, and is characterized in that, against $SiO_2$, a content of Na is 10 ppm or below, K 10 ppm or below, Cu 500 ppb or below, Ni 300 ppb or below, Fe 150 ppm or below, Cl 1000 ppm or below.

First Method of Producing Nodular Silica Sol

Concerning a first method of producing the nodular silica sol according to the present invention, a step of preparing a silicic acid solution as a feed, a step of aging the silicic acid solution, a step of preparing a seed liquid, a built-up step, and a step of highly purifying are described below in the order described above.

(1) Step of Preparing a Silicic Acid Solution as a Feed

The silicic acid solution used as a feed in the production method according to the present invention means a solution of low-polymerized silicic acid obtained by processing an alkali silicate solution with a cation exchange resin to remove alkali.

As an alkali silicate, for instance, each of a sodium silicate, a potassium silicate, a lithium silicate and a quaternary ammonium silicate is available, and preferably, the sodium silicate or the potassium silicate commercially available by the designation of a number one water glass, a number two water glass, a number three water glass or the like are selected. The alkali silicic acid solution obtained by hydrolyzing a hydrolyzable organic compound such as a tetra-ethyl-ortho-silicate (TEOS) using an excessive amount of NaOH or the like is also preferable.

The method of producing the alkali silicate is not limited to that described above and any publicly known method is applicable. As the production method described above, for instance, Japanese Patent Laid-Open Publication HEI No. 9-110416 discloses a method of producing the alkali silicate solution in which an alkali silicate glass cullet is dissolved in water at the presence of a seed crystal made from a calcium silicate to obtain a alkali silicate aqueous solution, and then the alkali silicate aqueous solution is subjected to filtration to obtain an alkali silicate aqueous solution. Also Japanese Patent Laid-Open Publication HEI No. 6-171924 discloses a method of producing the alkali silicate solution in which an alkali hydroxide aqueous solution (AOH; A: alkali metal) is added to soft silica to dissolve the silicate contents in the soft silica for producing an alkali silicate aqueous solution having the composition of $A_2O.nSiO_2$, and in this step, hydrogen peroxide is added to the aqueous solution to oxidize reduction products derived from the soft silicate.

It is preferable to use a refined alkali silicate. A publicly known method is applicable for refining the alkali silicate. As the method available for achieving the object of the present invention, for instance, Japanese Patent Laid-Open Publication 2001-294420 discloses a method in which viscosity of the alkali silicate solution is preliminarily adjusted to 1-50 mPa·s, and then the solution is passed through a ultrafiltration film with the molecular weight cutoff of not more than 15,000 to obtain the alkali silicate solution. In the alkali silicate aqueous solution obtained by the method described above, a content of Cu per silica is not more than 200 ppb and a particle with the diameter of 1 nm or more does not exist substantially.

As a method of preparing an acid silicic acid solution available for achieving the object of the present invention, there is, for instance, a method in which an acidic silicic acid solution is prepared by contacting a strong acidic cation exchanger to the alkali silicate solution with the silica concentration of 1-10 weight % by diluting the alkali silicate with water as a preferable method of producing the silicic acid solution used as a feed.

The method of producing the silicic acid solution used as a feed in the production method according to the present invention is as described above, but preferably the silicic acid solution produced by the method is contacted to a strong acidic cation exchanger or a strong basic anion exchanger for purification. In this case, the silicic acid solution is preferably contacted with the strong acidic cation exchanger and then the strong basic anion exchanger, but the silicic acid solution can be contacted with the strong basic anion exchanger and then the strong acidic cation exchanger, if required.

The silicic acid solution may iteratively be contacted with the ion exchangers according to the necessity and the contact time may be adjusted. The alkali silicate solution may iteratively be contacted with the strong acidic cation exchanger to prepare the acid silicic acid solution and then contacted with the strong basic anion exchanger to be highly purified.

In particular, the silicic acid solution is contacted with the strong acidic cation exchanger to adjust the pH preferably to not more than 6 and then with strong basic anion exchanger to adjust the pH preferably to not less than 9, and the eluted impurity ions are removed. The silicic acid solution may be contacted with the ion exchangers, for instance, by passing a aqueous silica sol through a column filled with the cation exchangers or the anion exchangers, and the silica concentration of the silicic acid solution can be adjusted by adding deionized water before contacting the silicic acid solution with the strong basic anion exchanger and the strong acidic cation exchanger.

Any known strong basic anion exchanger such as a hydroxyl strong basic anion exchange resin, a Cl type anion exchange resin or the like may be used in the present invention. Also any known strong acidic cation exchanger such as a hydric-type strong acidic cation exchange resin, a styrene sulfonic acid type resin cross-linked with divinylbenzene, a phenol sulfonic acid type resin cross-linked with formaldehyde or the like may be used in the present invention. A macroporous type resin may be used. The aqueous silica sol is usually contacted with the ion exchanger at the space velocity of 1-30 $h^{-1}$.

(2) Step of Aging the Silicic Acid Solution

Used in the method of producing the nodular silica sol of the present invention is a silicic acid solution with the pH in the range from 1.0 to 7.0 and the silica concentration in the range from 0.05 to 3% by weight. The silicic acid solution with the pH in the above range at the stage of preparing can be applicable to the production method according to the present invention without particularly adjusting the pH. On the other hand, when the pH is less than 1.0, the silicic acid solution is applied to the production method according to the present invention after adding the alkali and adjusting the pH to the range from 1.0 to 7.0. Also, when the pH is more than 7.0, the silicic acid solution can be applied to the production method according to the present invention after adding an acid and adjusting the pH range as well.

An alkali used for pH adjustment of the silicic acid solution includes, but not limited to, alkali metals such as NaOH, KOH or the like, an alkali silicate, ammonium water, water-soluble amines or the like. Also, an ammonium gas may be supplied to the silicic acid solution. An acid used for pH adjustment of the silicic acid solution may be an organic acid or an inorganic acid, and includes, but not limited to, a hydrochloric acid, a sulfuric acid, a nitric acid, a sulfamic acid, a formic acid or the like.

When the pH of the silicic acid solution is in the range from 1.0 to 7.0 and other requirements are satisfied, a silicic acid solution with the viscosity in a prespecified range can be obtained without causing gelation. Therefore the nodular silica sol according to the present invention can be obtained by subjecting the polymerized silicic acid solution to the step of preparing a seed liquid and the build-up step. Since the silicic acid solution gelates when the pH is less than 1.0 or more than 7.0, the nodular silica sol with the association ratio less of than 2.7 and having excellent adaptability to filtration and high polishing performance is not obtained even when applying the silicic acid solution to the seed liquid preparation step.

The silicic acid solution with the silica concentration from 0.05 to 3% by weight is preferably used. When the silica concentration exceeds 3% by weight, the silicic acid solution is easily gelated. When the silica concentration is less than 0.05 weight %, the production efficiency drops, so that the silicic acid solution is not suited to practical use. In the present invention, the silicic acid solution with the pH ranging from 1.0 to 7.0 and the silica concentration of 0.05 to 3% by weight is aged at the temperature of 1 to 98° C. to prepare the polymerized silicic acid solution with the viscosity of the silicic acid in the range from 0.9 to 100 mPa·s. The silicic acid solution is left at rest for about a few minutes to 100 hours and aged to obtain the polymerized silicic acid solution with the viscosity range as described above.

(3) Step of Preparing a Seed Liquid

An alkali is added to the polymerized silicic acid solution with the viscosity of silicic acid in the range from 0.9 to 100 mPa·s and then the polymerized silicic acid solution is heated. The alkali used in this step includes, but not limited to, ammonium water, and water-soluble amines. Also, the ammonium gas may be supplied to the silicic acid solution.

In particular, the seed liquid containing the silica sol is obtained by adding the alkali to the polymerized silicic acid solution, adjusting the pH preferably to 9 to 12.5 and storing the polymerized silicic acid solution for 10 minutes to 5 hours at the temperature of 50 to 150° C., preferably 60° to 95° C. When the pH is less than 9, polymerization in the polymerized silicic acid solution does not progress enough to obtain the intended seed. When the pH is over 12.5, the seed sol dissolves and the intended seed is not obtained. When the heating temperature is less than 50° C., a homogeneous silica sol is not always obtained. When the heating temperature is over 150° C., distribution of particle diameters of the obtained silica is apt to be heterogeneous. The build-up step is executed using the silica sol as the seed liquid.

(4) Build-Up Step

The alkali is added to the seed liquid, if required, to adjust the pH to the range from 10 to 12.5. When the pH of the seed liquid is in the range from 10 to 12.5, the pH does not need adjustment by adding the alkali.

The pH is adjusted by adding the ammonium water, the water-soluble amines, the alkali silicate or the like to the seed liquid or supplying the ammonium gas to the seed liquid. Any of the sodium silicate, the potassium silicate, the lithium silicate, the quaternary silicate may be used as the alkali silicate, but the sodium silicate or the potassium silicate commercially available by the designation of the number one water glass, the number two water glass, the number three water glass or the like are preferably selected. The alkali silicate solution obtained by hydrolyzing a hydrolyzable organic composition such as a tetra-ethyl-ortho-silicate (TEOS) with an excessive amount of NaOH or the like is also preferable. When the pH is over 12.5, the gained nodular silica sol contains many not-nodular particles, and when the pH is less than 10, new nuclei are generated and nodular particles do not grow sufficiently.

Keeping the temperature of the seed liquid with the pH adjusted to the range from 10 to 12.5 at a range from 20 to 98° C., the silicic acid solution or the highly purified silicic acid solution is added to the seed liquid continuously or intermittently to grow the silica fine particles. The silicic acid solution is preferably used in which impurities are removed by contacting the strong basic anion exchanger or the strong acidic cation exchanger to the silicic acid solution prepared with the production method described above. The silicic acid solution may also be used in which the alkali is discharged from a surface as well as from inside of the particles by adding an acid to the silicic acid solution according to the necessity and heating the same at the temperature of 40 to 300° C.

As for the nature of the acid, the so-called strong acid is used to allow for the effect for eluting cations from the silica fine particles. More specifically, the inorganic acid or the organic acid is preferably used, and generally it is recommended to use any of the hydrochloric acid, the sulfuric acid, the nitric acid, the sulfamic acid, the formic acid. The acid is added to the silicic acid solution usually in the form of the aqueous solution with the acid concentration of 1 to 20%. The acid is added so that the pH of the silicic acid solution is preferably in the range from 0 to 3.

The seed liquid is stored at the constant temperature of over 20° C., preferably in the range from 20 to 98° C. to grow the silica fine particles in the seed liquid. When the temperature of the seed liquid is less than 20° C., a rate of dissolution of the silicic acid solution in the added polymerized silicic acid solution and a precipitation rate of the solved silica on the seed slow down. In this case there is no way but to slow down an addition rate of the polymerized silicic acid solution. On the other hand, a rise of the temperature has the advantage of rising the dissolution rate and the precipitation rate, but in this case it becomes difficult to control the particle diameters, which is disadvantageous in achieving the objects of the present invention.

When adding the silicic acid solution, it is essential that the silica in the polymerized silicic acid solution precipitates into the seed in the seed liquid to prevent generation of new seeds. Therefore, the addition rate of the silicic acid solution into the seed liquid has a great influence on the particle diameters, the particle size distribution and forms of the silica fine particles in the final product. In the production method according to the present invention, the silicic acid solution is desired to be added continuously or intermittently spending preferably 30 minutes to 72 hours. With this configuration, the nodular silica sol is obtained.

It is to be understood that the seed liquid can continue to be heated at the temperature of 20 to 98° C. for 0.5 to 12 hours after the silicic acid solution is added to the seed liquid according to the necessity. The more stable nodular silica sol can be obtained by continuously heating the silica sol.

(5) Step of Highly Purifying the Silicic Acid Solution

After the build-up step is finished, the strong basic anion exchanger is contacted to the obtained silica sol to adjust the pH preferably to 9 or more, and furthermore the strong acidic cation exchange is contacted to the silicic acid solution to adjust the pH preferably to 6 or below for the purpose to removed the eluted impurity ions. The silicic acid solution can be contacted to the anion exchanger by passing through the aqueous silica sol through a column with the anion exchanger or the cation exchanger filled therein. In a case of a silica sol, the silica concentration may be adjusted by adding deionized water before the silica sol is contacted to the strong basic anion exchanger or the strong acidic cation exchanger.

Any known strong basic anion exchanger may be used, and for instance, hydroxy group strong basic anion exchange resin or Cl type anion exchange resin may be used for achieving the objects of the present invention. Also any known strong acidic cation exchanger may be used, and the strong acidic cation exchanger available for achieving the objects of the present invention include, but not limited to, hydrogen type strong acidic cation exchange resin, styrene-based sulfonic acid resin, and formaldehyde-bridged sulfonic acid resin. Furthermore macroporous resin may be used. Contact between the aqueous silica sol and an ion exchanger is generally performed at the space velocity of 1 to 30 $h^{-1}$.

When the nodular silica sol is subjected to the processing for purification, contents of impurities remaining in the silica particles against $SiO_2$ are 10 ppm or below for Na, 10 ppm or below for K, 500 ppb or below for Cu, 300 ppb or below for Ni, and 150 ppm or below for Fe.

The nodular silica sol obtained by the production method according to the present invention can be converted to an organosol by any known method such as distillation under reduced pressure, and ultrafiltration and by replacing water as a dispersion medium with an organic solvent. The organic solvent available for achieving the object of the present invention includes, for instance, alcohols, glycols, esters, ketones, nitrogen compounds, and aromatic compounds, and more specifically it is preferable to use an organic solvent such as methanol, ethanol, propanol, ethylene glycol, propylene glycol, glycerin, ethyleneglycol monomethyl ether, propyleneglycol monomethyl ether, acetone, methyl ethyl ketone, dimethyl formamide, and N-methyl-2-pyrrolidone. In addition, it is also possible to use high polymer compounds such as polyethylene glycol, or silicone oil as the dispersion medium.

Furthermore, it is possible to produce a sol by processing surfaces of silica particles with any known method and using a low polarity organic solvent such as xylene, toluene, and dimethyl ethane. The surface processing agent available in the step as described above includes, for instance, alkoxide compounds such as tetraethoxy silane, a silane coupling agent, a titanium coupling agent, low-molecular-weight or high-molecular-weight surface surfactants, metallic salts of higher fatty acids, or metallic soap such as a metallic salt of naphthenic acid.

Furthermore it is possible to convert silica particles to a sol excellent in dispersibility, light stability and in other properties by modifying a surface of the particle with an inorganic compound such as silica or alumina, and any known method may be employed for the processing. It is also possible to employ the method disclosed in Japanese Patent Laid-Open Publication No. HEI 7-315832 filed by the present applicant. In the method, a polymerized silicon compound is added to an alkaline alumina sol prepared by dispersing crystalline alumina particles in water.

It is especially desirable to use, as a polishing material, the nodular silica sols obtained by the production method according to the present invention and having the characteristics as described below. Namely the nodular silica sol available for achieving the object of the present invention should have a ratio of an average particle diameter (r) obtained through measurement by means of the dynamic light scattering method versus a particle diameter (r') converted to that of an equivalent sphere computed from an average specific surface area (r/r', referred to as "association ratio") of 1.2 or more and less than 2.7, the average particle diameter calculated by the dynamic light scattering method (r) in the range from 10 to 200 nm (or in the range from 9 to 90 nm as the equivalent sphere-converted particle diameter (r') calculated from the average specific surface area measured by the nitrogen absorption method), and the specific surface area in the range from 30 to 300 $m^2/g$.

The nodular silica sol having the association ratio of less than 2.7 is excellent in the filtering property, and especially in the polishing performance, and, for instance, an amount of the sol passing through a flat filter with 0.45 m mesh is 30 grams or more for a sheet of the filter. The polishing rate is more excellent as compared to a polishing material containing a conventional type of spheric silica sol, and also generation of large problemsome scratches can be suppressed.

In the first production method according to the present invention, materials used as a feed for production of a silica sol of slender particles such as calcium oxides, magnesium oxides, and alkyl silicate are not used, nor is used materials available for production of a silica sol of egg-like or pod-like particles such as methyl silicate at all. Because of the feature, in the nodular silica particles obtained by the production method according to the present invention, contents of Ca and Mg against $SiO_2$ are 1000 ppm or below.

Another Aspect of Nodular Silica Sol

Of the nodular silica sols according to the present invention, for instance, those in which silica particles having the association ratio (r/r') in the range from 1.2 to 4.0 and the average particle diameter (r) by the dynamic light scattering method in the range from 10 to 150 nm are dispersed and the absolute value of the difference between the zeta potentials at pH 5 and at pH9 is the range from 1 to 9 mV has an especially excellent polishing feature as a polishing material.

When the value of the association ratio is less than 1.2, a form of the particle has small effect on the nodular silica sol and the polishing speed is slow. When the value of the association ratio is in the range from 1.2 to 4.0, especially, the nodular silica sol is hard to have a high viscosity and to cause a clogging in a polishing pad, or a scratch even at a high polishing speed. When the association ratio is over 4.0, such a feature is slightly lowered, but can be substantially used without any problem until the association ratio comes to be 10.

When the average particle diameter (r) by the dynamic light scattering method is less than 10 nm, the polishing speed is slow and, over 150 nm, there is the tendency that a number of particles in the same concentration extremely decrease and the polishing speed is not gained. It is to be understood that the average particle diameter until 200 nm can be substantially used.

When the absolute value of the difference of the zeta potentials at pH 5 and at pH 9 is less than 1 mV, silica particles are sometimes easy to agglutinate and, over 9 mV, silica particles cross-react with other cationic ion and become easy to agglutinate. Therefore, it is especially preferable that the absolute value of the difference of the zeta potentials at pH 5 and at pH 9 is in the above-mentioned range in order to prevent silica particles from agglutinating.

Concerning the zeta potentials, a sample with the silica concentration of 2 weight % by diluting the silica sol with distilled water is measured with an ultrasonic style potential measuring device (Matec Corporation, ESA-800). The zeta potentials at pH 5 and at pH 9 are measured and a diluted nitric acid solution is used to adjust pH.

When the nodular silica sol according to the present invention is used for polishing particles, the nodular silica sol can be concentrated or diluted according to the necessity. A concentration method includes a method for evaporating moisture with heating, a method using the ultra filtration film or the like. The concentration of the silica sol is adjusted to the range from 10 to 50 weight % in the form of $SiO_2$.

Furthermore, the nodular silica sol according to the present invention can be changed to an organosol by replacing a solvent with an organic solvent. The organic solvent used for the solvent replacement includes an alcohol group such as a methanol, an ethanol, a propanol, a butanol, a diacetone alcohol, a furfuryl alcohol, a tetra-hydro-furfuryl-alcohol, an ethylene glycol, a hexylene glycol or the like, an ester group such as a methyl acetate ester, an ethyl acetate ester or the like, an ether group such as a diethyl-ether, an ethylene-glycol-mono-methyl-ether, an ethylene-glycol-mono-ethyl-ether, an ethylene-glycol-mono-butyl-ether, a diethylene-glycol-mono-methyl-ether, a diethylene-glycol-mono-ethyl-ether or the like, a ketone group such as an acetone, a methyl-ethyl-ketone, an acetyl acetone, an acetoacetic acid ester or the like, and an amide group such as an N-methyl-pyrrolidone, a di-methyl-formamide or the like. The above-mentioned organic solvent can be used independently or more than two organic solvents can be mixed.

The nodular silica sol according to the present invention can be used after treating a surface with the silane coupling agent and adding a hydrophobic nature, or after removing the alkali in the silica sol with the ion exchange resin or the like according to the necessity.

Second Method of Producing a Nodular Silica Sol

A second method of producing a nodular silica sol according to the present invention is described below.

Step (1)

Preferably one or more silicates selected from the group consisting of alkali metal silicates, ammonium silicates, and silicates of organic bases are used as a feed for the production method according to the present invention. As an alkali metal silicate, sodium silicate (wager glass) or a potassium silicate is preferably used. As an organic base, it is preferable to use any of quaternary ammonium salts such as a tetraethyl ammonium salt and amines such as monoethanol amine, diethanol amine, triethanol amine. As an ammonium silicate or a silicate of organic base, it is possible to use an alkaline solution prepared by adding ammonia, a quarternary ammonium hydroxide, or an amine compound.

In the step (1), at first an aqueous solution of the silicate(s) is prepared. Then the aqueous solution of the silicate is neutralized with a acid to prepare a hydrogel. A concentration of the silicate aqueous solution (a content of $SiO_2$) is in the range from 1 to 10% by weight, and more preferably in the range from 2 to 8% by weight. The temperature should be kept at the room temperature (normally in the range from 15 to 35° C.), and the pH after neutralization is preferably in the range from 3 to 7.

When the concentration calculated as a content of $SiO_2$ is 1% by weight or below, the silicic acid is not gelated sufficiently, and it is not easy to obtain a hydrogel under the practical conditions. On the other hand, when the concentration calculated as a content of $SiO_2$ is over 10% by weight, the homogeneous neutralization and sufficient gelation of the silicic acid can not be performed, and size dispersion becomes larger in the nodular silica sol finally obtained.

When the pH after neutralization is in the range from 3 to 7, it is easy t obtain a homogeneous hydrogel, and when the pH is less than 3, the hydrogel structure is fragile, and silica easily elute from the woven textile. When the pH is over 7, siloxane coupling occurs partially, and deflocculation can hardly be performed. Any of hydrochloric acid, sulfuric acid, and nitric acid may be used for the neutralization.

The silica hydrogel obtained by neutralization is cleaned mainly for removing the salts generated by the neutralization. Ordinarily the silica hydrogel is cleaned with deionized water or ammonia water by sing a filtering machine such as the Oliver filter.

For instance, when sodium sulfate is generated, a concentration of the sodium sulfate after cleaning is preferably 0.05% or below against a solid state of $SiO_2$, and time required for deflocculation becomes shorter. When a concentration of the salt is high, even if deflocculation occurs, a negative charge in the sol particles is small, and aggregates are not easily generated, which makes it difficult to obtain a stable sol.

An alkali is added to the silica hydrogel just having been subjected to a cleaning process to deflocculate the silica hydrosol. Ordinarily, water is added to the silica sol to obtain a slurry-state silica hydrosol dispersion having fluidity with a strong agitator, and a proper amount of alkali is added to the dispersion to deflocculate the silica hydrogel.

A concentration of the silica hydrogel dispersion calculated as $SiO_2$ content is preferably in the range from 0.5 to 10% by weight, and more preferably in the range from 3 to 7% by weight. When the concentration is less than 0.5% by weight, a percentage of dissolved silica increases, and an average diameter of obtained silica particles becomes smaller, a particle growth speed in building-up in the step (2) is apt to become remarkably slow. When the concentration as calculated as $SiO_2$ content is over 10% by weight, an average diameter of the silica particles obtained by deflocculation will become heterogeneous. Because of the feature, distribution of particles of nodular silica sol particles obtained in the step (2) is apt to become heterogeneous.

As an alkali, an alkali metal hydroxide such as KOH, NaOH or the like, ammonium hydroxide, or an aqueous solution of amine may be used.

An amount of alkali used in the process as calculated as a ratio of a number of moles of $SiO_2$ in the silica hydrogel dispersion and a number of moles of the alkali in the silica hydrogel ($SiO_2/M_2O$) is preferably in the range 30 to 500, and more preferably in the range from 40 to 200. When the molar ratio ($SiO_2/M_2O$) is less than 30, a percentage of dissolved silica increases, and finally production efficiency or yield of the modular silica sol drops. When the molar ratio ($SiO_2/M_2O$) is more than 500, the deflocculation is insufficient, and distribution of particles of silica sol used as seed particles for building up in the step (2) becomes heterogeneous, so that also distribution of diameters of nodular silica sol particles finally obtained becomes broad.

When deflocculation is to be performed, the pH is preferably in the range from 5 to 11. When the pH is less than 5, the dispersion has high viscosity, which makes it difficult to obtain a stable silica sol. When the pH is over 11, silica easily dissolves and becomes unstable.

The temperature at a step where the silica hydrogel is deflocculated is preferably in the range from 60 to 200° C., and more preferably in the range from 70 to 170° C. When the temperature is less than 60° C., sometimes the silica gel may no be deflocculated sufficiently homogeneously. When the temperature is over 200° C., a form of obtained silica sol particles is apt to become spherical.

Step 2

Using the silica sol obtained at the step (1) described above as a seed sol, silicic acid solution is added continuously or intermittently to the silica sol at the temperature in the range 60 to 200° C. to prepare a nodular silica sol. If required, the seed sol is diluted with deionized water, or an alkali or a silicate is added to the seed sol to adjust a concentration of solid phase silica to the range from 2 to 10% by weight and pH to the range from 9 to 12.5. When the pH is less than 9, a potential in the particles become smaller and the particles aggregate with the distribution of particle diameters extended. When the pH is over 12.5, solubility of the particles goes high, and particle growth becomes difficult.

There is no specific restriction over types of the alkali available in this process. It is preferable to use an alkali metal hydroxide such as KOH or NaOH, ammonium hydroxide, an aqueous solution of amine, ammonia water or the like. Also there is no specific restriction for the silicate available in this process, and the silicate as described in relation to the step (1) may be used. It is especially preferable to use sodium silicate, potassium silicate, and the like.

Next silica particles are grown by continuously or intermittently adding a silicic acid solution keeping a temperature of the seed sol in the range from 60 to 200° C. An amount of added silicic acid is adjusted according to a desired diameter of particles in the nodular silica sol.

In the silica sol obtained in the step (1) which is used as a seed sol, the average particle diameter measured by the dynamic light scattering method is preferably in the range from 5 to 80 nm. When the silica sol with particles having the average diameter in the range described above is used as a seed sol, the average particle diameter (r) measured by the dynamic light scattering method is generally in the range from 10 to 150 nm. If required, the silica sol obtained in step (1) may be processed with a centrifugal separator for screening.

It is preferable to use a silicic acid solution obtained by dealkylating an aqueous solution of the alkali silicate with a cation exchanger. The silicic acid solution available in this process is a solution of a low-molecular-weight polymer of the silicic acid solution obtained by processing an aqueous solution of an alkali silicate with a cation exchanger, and the silicic acid solution is generally referred to as an acidic silicic acid solution. Generally a silicic acid solution with the $SiO_2$ in the range from 1 to 10% by weight is used.

Any of sodium silicate, potassium silicate, lithium silicate, and quarternary ammonium silicate may be used as the alkali silicate, and preferably sodium silicate or potassium silicate is selected. The material is sold in the market with the trade names of Water Glass No. 1, Water Glass No. 2, Water Glass No. 3 or the like. Furthermore it is also preferable to use an aqueous solution of the alkali silicate obtained by hydrolyzing a hydrolysable organic compound such as tetraethyl olthosilicate (TEOS) by using, for instance, an excessive amount of NaOH.

There is no specific restriction over a method of producing the alkali silicate described above, and any known method may be employed in this process. As the production method as described above, for instance, Japanese Patent Laid-Open Publication No. HEI 9-110416 a method of producing an aqueous solution of alkali silicate in which alkali silicate cullet is dissolved in water in the presence of a seed crystal made of alkali silicate calcium to obtain an aqueous solution of alkali silicate, and then the alkali silicate aqueous solution is subjected to filtration. Furthermore, Japanese Patent Laid-Open Publication No. HEI 6-171924 discloses a method in which, when an aqueous solution of alkali silicate having the composition of $A_2O.nSiO_2$ is produced by adding an aqueous solution of alkali hydroxide (AOH; A: Alkali metal) in soft silica to elute silicates in the silica, hydrogen peroxide is added to the aqueous solution to oxide reduction products originated from the soft silica.

It is recommended to use the alkali silicate which is preferably highly refined. Any known method may be used for refining the alkali silicate. One of the methods available in the present invention is a method disclosed in Japanese Patent Laid-Open Publication No. 2001-294420, and in this method, viscosity of the alkali silicate aqueous solution is adjusted to the range from 1 to 50 mPa·s and the aqueous solution is passed through a ultra-filtration film with the molecular weight cut off of 15,000 or below to prepare an aqueous solution of alkali silicate in which particles with the Cu content per silica of 200 ppb or below and the size of 1 nm is substantially not present.

It is desirable to use the silicic acid solution in which impurities are removed by contacting the silicic acid solution to a strong basic anion exchanger or a strong acidic cation exchanger. Furthermore, if required, an acid may be added to the silicic acid solution, and the mixture solution is heated at a temperature in the range from 40° C. to 300° C. to have the alkali released in a surface or an inside of the particles.

As for a type of the acid used in the process, the so-called strong acid is used because a strong acid is effective in having cations eluted from silica particles. More specifically, an organic strong acid or an inorganic strong acid may be used, and ordinarily such as a strong acid as hydrochloric acid, sulfuric acid, nitric acid, sulfamic acid, formic acid is used. When adding an acid to the silicic acid solution, an acid solution with 1-20% concentration is generally used, and an amount of added acid is controlled so that pH of the silicic acid solution is adjusted to the range from 0.1 to 1.0.

When growing silica particles in a seed sol, a temperature of the seed sol is kept in the range from 60 to 200° C. When the temperature of the seed sol is less than 60° C., a rate of dissolution of a silicic acid in the seed sol with the silicic acid solution added therein and a rate of segregation of the silicic acid in the seed sol become slower. On the other hand, when the temperature of the seed solution is higher than 200° C., the rate of dissolution of a silicic acid in the seed sol with the silicic acid solution added therein and a rate of segregation of the silicic acid in the seed sol becomes higher, which is advantageous, but it becomes difficult to control a diameter and a form of the particles, so that the cost performance of the process becomes higher, which is disadvantageous.

When adding a silicic acid solution, it is necessary to prevent generation of new seeds. A rate of addition of a silicic acid solution to a seed liquid gives serious influences over a diameter of silica particles, distribution of particle diameters, and forms of the particles in the final product. In the production method according to the present invention, it is desirable to add a silicic acid solution for 30 minutes to 72 hours continuously or intermittently. With this operation, it is possible to obtain a nodular silica sol.

Also in the second production method according to the present invention, a calcium oxide, magnesium oxide, alkyl silicate and the like which are used as a feed for preparing a sol of slender silica particles are not used, nor is used such materials as methyl silicate which are used as a sol of egg-like or pod-like silica particles at all. Therefore, in the nodular silica particles obtained by the production method according to the present invention, a percentage of Ca or Mg against $SiO_2$ is 1000 ppm or below, and also Cl is substantially not contained in the particles.

Also in the second production method according to the present invention, it is possible to use the highly purified silicic acid solution as a silicic acid solution used in the production process like in the first production method. Also it is possible to prepare a highly purified nodular silica sol by highly purifying the nodular silica sol obtained by the second production method like in the first production method.

The nodular silica sol according to the present invention is effectively available as a polishing material, and the polishing material containing the nodular silica sol according to the present invention can be used as a polishing material for a hard disk, for a wafer, or for a Cu-CMP.

Example 1

Production of Nodular Silica Sol
1-1) Production of a Silicic Acid Solution 7,000 grams of sodium silicate with the concentration of 7% (water glass No. 3) was passed through a ultra-filtration module (produced by Asahi kasei Corporation: SIP-1013) and the filtered water was recovered to obtain purified water glass. Then deionized water was added to the purified water glass to adjust the silica content to 5%. Then 6,500 grams of water glass with the silica content of 5% was passed through 2.2 litters of the strong acidic cation exchange resin SK1 BH (produced by Mitsubishi Chemicals Corporation) by at the space velocity of 3.1 to obtain 6,650 grams of silicic acid solution. The silica content in the obtained silicic acid solution was 4.7%.

1-2) Processing for Highly Purifying a Silicic Acid Solution 6,650 grams of the silicic acid solution was again passed through 0.4 litters of the strong acidic cation exchange resin SK1 BH (produced by Mitsubishi Chemicals Corporation) at the space velocity of 3.1 to obtain a highly purified silicic acid solution with the silica content of 4.4%. For checking impurities in the obtained silicic acid solution, ultra pure water was added to the silicic acid solution to adjust the concentration to 10% by weight. Then contents of the compounds of alkali metals such as sodium (Na) and potassium (K) and compounds of halogen elements such as chlorine (Cl) contained as impurities in the silicic acid solution were measured by the atomic absorption method (AAS method) with the polarized Zeeman atomic absorption photometer (produced by Hitachi Co.: Z-5300) and also with the ion chromatograph (produced by Kyoto Electronic Industry: AT-610) respectively. The contents were 50 ppb or below for Na, 50 ppb or below for k, and 1 ppm or below for Cl.

1-3) pH Adjustment and Aging of a Silicic Acid Solution 545.5 grams of deionized water was added to 454.5 grams of the silicic acid solution obtained in the process above to adjust a concentration of silica to 2%, and the mixture solution was agitated for 10 minutes. At this point of time, the pH was 3.8. Then, 0.4 grams of ammonia water with the concentration of 1% was added to the mixture solution to adjust the pH to 4.5 and was kept for 2 hours at the room temperature for aging to obtain 1,000 grams of polymerized silicic acid solution. Viscosity of the polymerized solution was measured with the Type B viscosity meter to find that the viscosity was 1.3 mPa·s. In all of the examples and comparative examples described below, the meter was used for measurement of viscosity.

1-4) Production of a Seed Liquid 61.2 grams of ammonia water with the concentration of 15% was added to 1,000 grams of the polymerized silicic acid solution to adjust the pH to 10.4. The temperature was raised to 95° C., and the mixture was heated for one hour at the temperature, and then was cooled to the room temperature to obtain a transparent and pale sol. The obtained sol was measured by the dynamic light scattering method to find that the average particle diameter was 20 nm, and the silica concentration was 1.9%. For measurement of the average particle diameter by the dynamic light scattering method, the particle diameter distribution meter (produced by Otsuka Electronics Co.: PAR-III) was used. In the examples and comparative examples described below, this device was used for measurement of the average particle diameter by the dynamic light scattering method.

1-5) Build-Up 79.68 grams of ammonia water with the concentration of 15% was added to 284.7 grams of the sol obtained by heating as described above to adjust the pH to 11.4, and the mixture was heated to 83° C. and was kept at the temperature for 30 minutes.

2,954.3 grams of highly purified acidic silicic acid solution with the concentration of 4.4% was prepared by the production method described in 1-1) and 1-2) above, and 38 grams of sulfuric acid with the concentration of 1% was added, and further deionized water was added to the mixture to obtain 4,333 grams of highly purified silicic acid solution with the concentration of 3% by weight.

4,333 grams of the highly purified silicic acid solution was added to the heated sol over 18 hours. After addition of the silicic acid solution, the mixture was kept for one hour at 83° C. and then cooled to the room temperature.

Conditions for preparation of the silica sol are shown in Table 1.

1-6) Ultra Condensation

The sol having been subjected to building-up process was condensed to the concentration of 10% with a ultra-filtration film (produced by Asahi Kasei Corporation, SIP-1013).

1-7) Condensation with a Rotary Evaporator

The sol was condensed to the concentration of 16% with the evaporator.

1-8) Measurement of Physical Properties

The average particle diameter (r) of Examples 1 to 12 and Comparative Examples 1 to 5 measured by means of the dynamic light scattering method is measured by the particle diameter distribution measuring device (produced by Otsuka Electronics Co.: LP-510 PAR-III) using a laser beam.

The average diameter (r) of particles in the sol obtained as described above was measured by the dynamic light scattering method to find that the average diameter was 37 nm. The specific surface area was 118 $m^2/g$, and the particle diameter (r') calculated as that of an equivalent particle based on the specific surface area was 23.1 nm. Therefore, the association ratio (r/r') was 1.6.

For measurement of the specific surface area, $HNO_3$ was added to 50 ml of the sol to adjust the pH to 3.5. Then 40 ml of n-propane was added to the mixture and was dried for 20 hours at the temperature of 110° C. to obtain the sample. A specific surface area of the sample was measured with a specific surface area meter (produced by Yuasa Ionics Co.: Multisorp 12) and by the nitrogen absorption method (BET method). A result of the measurement is shown in Table 2. In all of the examples and comparative examples described below, this device was used for measurement of a specific surface area.

1-9) Measurement of Impurities

Ultra pure water was added to the sol obtained as described above to adjust the concentration to 10% by weight, and contents of impurities (Na, K) in the aqueous solution were measured by the atomic absorption method (AAS method) with the atomic absorption photometer (produced by Hitachi Corp.: Z-5300).

A content of chlorine (Cl) was measured by the ion chromatograph (produced by Kyoto Electronic Industry: AT-610). Contents of Ca, Mg, and Fe were measured with the induction coupling plasma emission spectrometer (produced by Seiko Electronics Co.). Contents of Cu and Ni were measured with the atomic absorption photometer Z-8200 (produced by Hitachi Corp.). A content of C (carbon) was measured with EMIA-320V (produced by HORIBA Corp.).

Contents of impurities in nodular particles in the nodular silica sol obtained as described above were as follows: 1 ppm or below for Na, 1 ppm or below for K, 300 ppb or below for Cu, 100 ppb or below for Ni, and 50 ppm or below for Fe. When converted to the oxides, the contents were 100 ppm or below for Mg, and 100 ppm or below for Ca. Furthermore, the contents were 10 ppm or below for C, and 1 ppm or below for Cl. A result of measurement is shown in Table 2.

In all of the examples and comparative examples described below, the device was used for measurement of impurities.

A result of analysis in Examples 2 to 9 is shown in Table 2. A result of analysis in Examples 13 to 23 is shown in Table 4.

Example 2

Deionized water was added to the highly purified silicic acid solution obtained as described in the processes 1-1) and 1-2) in Example 1 to adjust the silica concentration to 2%, and the mixture solution was agitated for 10 minutes without adding ammonia water with the concentration of 1% to keep the pH at 3.8. The mixture solution was kept at the room temperature for 2 hours for aging to obtain 6,650 grams of polymerized silicic acid solution. Viscosity of the silicic acid in the polymerized silicic acid solution was 1.1 mPa·s.

Ammonia water with the concentration of 15% was added to 1,000 grams of the polymerized silicic acid solution to adjust the pH to 10.4. Then the mixture solution was heated to 95° C. and kept at the temperature for one hour, and then was cooled to the room temperature to obtain a transparent and pale sol. An average diameter of particles in the obtained sol was measured by the dynamic light scattering method to find that the average diameter was 16 nm, and the silica content was 1.9%.

9.68 grams of ammonia water with the concentration of 15% was added to 284.7 grams of the heated sol to adjust the pH to 11.4, and the mixture was heated to 83° C. and kept at the temperature for 30 minutes. Then 4,333 grams of the highly purified silicic acid solution (with the silica concentration of 3% by weight) was added over 18 hours like in Example 1. After addition was finished, the mixture was kept at 83° C. for one hour and then was cooled to the room temperature.

Then the mixture solution was condensed by means of ultra-condensation and by using a rotary evaporator like in the processes 1-6) and 1-7) in Example 1, and the physical properties were measured. The average diameter (r) of particles in the sol finally obtained was 33 nm. The specific surface area was 137 m²/g, the average particle diameter (r') calculated as that of an equivalent particle based on the specific surface area was 19.9 nm, and the association ration (r/r') was 1.61.

Example 3

Deionized water was added to the highly purified silicic acid solution obtained like in the process 1-1) and 1-2) in Example 1 to adjust the silica content to 2%, and the solution was agitated for 10 minutes. Then 0.4 grams of ammonia water with the concentration of 1% was added to adjust the pH to 4.5, and the mixture solution was kept at the temperature of 80° C. for one hour for aging to obtain 6,650 grams of polymerized silicic acid solution. Viscosity of the silicic acid in the polymerized silicic acid solution was 1.3 mPa·s.

Ammonia water with the concentration of 15% was added to 1,000 grams of the polymerized silicic acid solution to adjust the pH to 10.4. Then the silicic acid solution was heated to 95° C., and was kept at the temperature for one hour, and then was cooled to the room temperature to obtain a transparent and pale sol. An average diameter of particles in the sol obtained as described above was 33 nm when measured by the dynamic light scattering method, and a concentration of solid phase was 1.9%.

79.68 grams of ammonia water with the concentration of 15% was added to 284.7 grams of the sol obtained by heating as described above to adjust the pH to 11.4, and the mixture solution was heated to 83° C. and was kept at the temperature for 30 minutes. Then 4,333 grams of the highly purified silicic acid solution (with the silica content of 3% by weight) was added over 18 hours like in Example 1. After addition was completed, the mixture was furthermore kept at the temperature of 83° C. for one hour, and then was cooled to the room temperature.

The mixture solution was condensed by ultra-condensation and by using rotary evaporator like in 1-6) and 1-7) in Example 1, and the physical properties were measured. The average diameter (r) of particles in the sol finally obtained was 62 nm. The specific surface area was 102 m²/g, the average particle diameter (r') calculated as that of an equivalent sphere based on the specific surface area was 26.7 nm, and the association ratio (r/r') was 2.32.

Example 4

Deionized water was added to the highly purified silicic acid solution obtained like in the processes 1-1) and 1-2) in Example 1 to adjust the silica concentration to 2%, and the mixture solution was agitated for 10 minutes. 0.4 grams of ammonia water with the concentration of 1% was added to the mixture solution to adjust the pH to 4.5, and the resultant mixture solution was kept at 5° C. for two hours for aging to obtain 6,650 grams of polymerized silicic acid solution. Viscosity of the silicic acid in the polymerized silicic acid solution was 1.1 mPa·s.

Ammonia water with the concentration of 15% was added to 1,000 grams of the polymerized silicic acid solution to adjust the pH to 10.4. The mixture solution was heated to 95° C., and was kept at the temperature for one hour, and was then cooled to the room temperature to obtain a transparent and pale sol. An average diameter of particles in the obtained sol was 12 nm when measured by the dynamic light scattering method, and a concentration of the solid phase was 1.9%.

79.68 grams of ammonia water with the concentration of 15% was added to 284.7 grams of the sol obtained by heating as described above to adjust the pH to 11.4, and the solution was heated to 83° C. and was kept at the temperature for 30 minutes. Then, like in Example 1, 4,333 grams of the highly purified silicic acid solution (with the silica concentration of 3% by weight) was added to the mixture solution over 18 hours. After addition was completed, the solution was kept at 83° C. for one hour, and was then cooled to the room temperature.

The mixture solution was condensed by ultra-condensation and by using rotary evaporator like in 1-6) and 1-7) in Example 1, and the physical properties were measured. The average diameter (r) of particles in the sol finally obtained was 27 nm. The specific surface area was 157 m²/g, the average particle diameter (r') calculated as that of an equivalent sphere based on the specific surface area was 17.4 nm, and the association ratio (r/r') was 1.55.

Example 5

Deionized water was added to the highly purified silicic acid solution obtained like in the processes 1-1) and 1-2) in Example 1 to adjust the silica concentration to 2%, and the mixture solution was agitated for 10 minutes. Ammonia water with the concentration of 1% was added to the mixture solution to adjust the pH to 6.5, and the resultant mixture solution was kept at the room temperature for two hours for aging to obtain 6,650 grams of polymerized silicic acid solution. Viscosity of the silicic acid in the polymerized silicic acid solution was 1.3 mPa·s.

Ammonia water with the concentration of 15% was added to 1,000 grams of the polymerized silicic acid solution to adjust the pH to 10.4. The mixture solution was heated to 95° C., and was kept at the temperature for one hour, and was then cooled to the room temperature to obtain a transparent and pale sol. An average diameter of particles in the obtained sol was 13 nm when measured by the dynamic light scattering method, and a concentration of the solid phase was 1.9%.

79.68 grams of ammonia water with the concentration of 15% was added to 284.7 grams of the sol obtained by heating as described above to adjust the pH to 11.4, and the solution was heated to 83° C. and was kept at the temperature for 30 minutes. Then, like in Example 1, 4,333 grams of the highly purified silicic acid solution (with the silica concentration of 3% by weight) was added to the mixture solution over 18 hours. After addition was completed, the solution was kept at 83° C. for one hour, and was then cooled to the room temperature.

The mixture solution was condensed by ultra-condensation and by using rotary evaporator like in 1-6) and 1-7) in Example 1, and the physical properties were measured. The average diameter (r) of particles in the sol finally obtained was 32 nm. The specific surface area was 139 m²/g, the average particle diameter (r') calculated as that of an equivalent sphere based on the specific surface area was 19.6 nm, and the association ratio (r/r') was 1.63.

Example 6

Deionized water was added in Example 1 to the highly purified silicic acid solution obtained like in the processes 1-1) and 1-2) in Example 1 to adjust the silica concentration to 2%, and the mixture solution was agitated for 10 minutes. Sulfuric acid with the concentration of 1% was added to the mixture solution to adjust the pH to 2.0, and the resultant mixture solution was kept at the room temperature for two hours for aging to obtain 6,650 grams of polymerized silicic acid solution. Viscosity of the silicic acid in the polymerized silicic acid solution was 1.2 mPa·s.

Ammonia water with the concentration of 15% was added to 1,000 grams of the polymerized silicic acid solution to adjust the pH to 10.4. The mixture solution was heated to 95° C., and was kept at the temperature for one hour, and was then cooled to the room temperature to obtain a transparent and pale sol. An average diameter of particles in the obtained sol was 18 nm when measured by the dynamic light scattering method, and a concentration of the solid phase was 1.81%.

79.68 grams of ammonia water with the concentration of 15% was added to 284.7 grams of the sol obtained by heating as described above to adjust the pH to 11.4, and the solution was heated to 83° C. and was kept at the temperature for 30 minutes. Then, like in Example 1, 4,333 grams of the highly purified silicic acid solution (with the silica concentration of 3% by weight) was added to the mixture solution over 18 hours. After addition was completed, the solution was kept at 83° C. for one hour, and was then cooled to the room temperature.

The mixture solution was condensed by ultra-condensation and by using rotary evaporator like in 1-6) and 1-7) in Example 1, and the physical properties were measured. The average diameter (r) of particles in the sol finally obtained was 34 nm. The specific surface area was 128 m²/g, the average particle diameter (r') calculated as that of an equivalent sphere based on the specific surface area was 21.3 nm, and the association ratio (r/r') was 1.60.

Example 7

Deionized water was added in Example 1 to the highly purified silicic acid solution obtained like in the processes 1-1) and 1-2) in Example 1 to adjust the silica concentration to 2%, and the mixture solution was agitated for 10 minutes. Sulfuric acid with the concentration of 1% was added to the mixture solution to adjust the pH to 3.0, and the resultant mixture solution was kept at the room temperature for 72 hours for aging to obtain 6,650 grams of polymerized silicic acid solution. Viscosity of the silicic acid in the polymerized silicic acid solution was 78 mPa·s.

Ammonia water with the concentration of 15% was added to 1,000 grams of the polymerized silicic acid solution to adjust the pH to 10.4. The mixture solution was heated to 95° C., and was kept at the temperature for one hour, and was then cooled to the room temperature to obtain a transparent and pale sol. An average diameter of particles in the obtained sol was 60.4 nm when measured by the dynamic light scattering method, and a concentration of the solid phase was 1.89%.

79.68 grams of ammonia water with the concentration of 15% was added to 284.7 grams of the sol obtained by heating as described above to adjust the pH to 11.4, and the solution was heated to 83° C. and was kept at the temperature for 30 minutes. Then, like in Example 1, 4,333 grams of the highly purified silicic acid solution (with the silica concentration of 3% by weight) was added to the mixture solution over 18 hours. After addition was completed, the solution was kept at 83° C. for one hour, and was then cooled to the room temperature.

The mixture solution was condensed by ultra-condensation and by using rotary evaporator like in 1-6) and 1-7) in Example 1, and the physical properties were measured. The average diameter (r) of particles in the sol finally obtained was 80 nm. The specific surface area was 89 m²/g, the average particle diameter (r') calculated as that of an equivalent sphere based on the specific surface area was 30.6 nm, and the association ratio (r/r') was 2.61.

Example 8

Deionized water was added to the silicic acid solution with the silica concentration of 4.7% obtained like in the process 1-1) in Example 1 to adjust the silica concentration to 2%. The mixture solution was agitated for 10 minutes, and ammonia water with the concentration of 1% was added to the mixture solution to adjust the pH to 4.5. The resultant mixture solution was kept at the room temperature for two hours to obtain 6,650 grams of polymerized silicic acid solution. Viscosity of the polymerized silicic acid solution was 1.3 mPa·s.

Ammonia water with the concentration of 15% was added to 1,000 grams of the polymerized silicic acid solution to adjust the pH to 10.4. The mixture solution was heated to 95° C., and was kept at the temperature for one hour, and was then cooled to the room temperature to obtain a transparent and pale sol. An average diameter of particles in the obtained sol was 27 nm when measured by the dynamic light scattering method, and a concentration of the solid phase was 1.9%.

20.81 grams of water glass No. 3 with the silica concentration of 24.25% was added to 284.7 grams of the sol obtained by heating as described above to adjust the pH to 11.2. The mixture solution was heated to 83° C. and kept at the temperature for 30 minutes. Deionized water was added to the silicic acid solution (with the silica concentration of 4.7% by weight) produced in the production method as that described in 1-1) in Example 1 to adjust the silica concentration to 3%, and 4.333 grams of the silicic acid solution was added to the mixture solution described above over 18 hours. After addition was completed, the resultant mixture solution was kept at 83° C. for one hour and then was cooled to the room temperature.

The mixture solution was condensed by ultra-condensation and by using rotary evaporator like in 1-6) and 1-7) in Example 1, and the physical properties were measured. The average diameter (r) of particles in the sol finally obtained was 53 nm. The specific surface area was 112 m²/g, the average particle diameter (r') calculated as that of an equivalent sphere based on the specific surface area was 24.3 nm, and the association ratio (r/r') was 2.18.

Example 9

Deionized water was added to the highly purified silicic acid solution with the silica concentration of 4.7% obtained like in the process 1-1) in Example 1 to adjust the silica concentration to 2%. The mixture solution was agitated for 10 minutes, and ammonia water with the concentration of 1% was added to the mixture solution to adjust the pH to 4.5. The resultant mixture solution was kept at the room temperature for two hours to obtain 6,650 grams of polymerized silicic acid solution. Viscosity of the polymerized silicic acid solution was 1.3 mPa·s.

Ammonia water with the concentration of 15% was added to 1,000 grams of the polymerized silicic acid solution to adjust the pH to 10.4. The mixture solution was heated to 95° C., and was kept at the temperature for one hour, and was then cooled to the room temperature to obtain a transparent and pale sol. An average diameter of particles in the obtained sol was 27 nm when measured by the dynamic light scattering method, and a concentration of the solid phase was 1.9%.

24.2 grams of water glass No. 3 with the silica concentration of 24.28% was added to 1353.7 grams of the sol obtained by heating as described above to adjust the pH to 10.9. The mixture solution was heated to 87° C. and kept at the temperature for 30 minutes. Deionized water was added to the silicic acid solution (with the silica concentration of 4.7% by weight) produced in the production method as that described in 1-1) in Example 1 to adjust the silica concentration to 3%, and 4,143.3 grams of the silicic acid solution was added to the mixture solution described above over 14 hours. After addition was completed, the resultant mixture solution was kept at 83° C. for one hour and then was cooled to the room temperature.

The mixture solution was condensed by ultra-condensation and by using rotary evaporator like in 1-6) and 1-7) in Example 1, and the physical properties were measured. The average diameter (r) of particles in the sol finally obtained was 35 nm. The specific surface area was 195 m²/g, the average particle diameter (r') calculated as that of an equivalent sphere based on the specific surface area was 14 nm, and the association ratio (r/r') was 2.5.

Comparative Example 1

Deionized water was not added to the highly purified silicic acid solution with the silica concentration of 4.4 obtained like in the processes 1-1) and 1-2) in Example 1. Ammonia water with the concentration of 1% was added to the mixture solution to adjust the pH to 4.5. The mixture solution was kept at the room temperature for two hours for aging, and the silicic acid solution gelated to an agar-like substance.

1,000 grams of the gel was agitated with a medicine spoon, 600 grams of deionized water was added to soften the gel, and furthermore ammonia water with the concentration of 15% was added to adjust the pH to 10.4. The mixture solution was heated to 95° C., and was kept at the temperature for one hour, and was then cooled to the room temperature to obtain a sol. An average diameter of particles in the obtained sol was 53 nm when measured by the dynamic light scattering method, and a concentration of the solid phase was 4.2%.

79.68 grams of ammonia water with the concentration of 15% was added to 284.7 grams of the sol obtained by heating as described above to adjust the pH to 11.4, and the solution was heated to 83° C. and was kept at the temperature for 30 minutes. Then, like in Example 1, 4,333 grams of the highly purified silicic acid solution (with the silica concentration of 3% by weight) was added to the mixture solution over 18 hours. After addition was completed, the solution was kept at 83° C. for one hour, and was then cooled to the room temperature.

The mixture solution was condensed by ultra-condensation and by using rotary evaporator like in 1-6) and 1-7) in Example 1, and the physical properties were measured. The average diameter (r) of particles in the sol finally obtained was 68 nm. The specific surface area was 125 m²/g, the average particle diameter (r') calculated as that of an equivalent sphere based on the specific surface area was 21.8 nm, and the association ratio (r/r') was 3.12.

Comparative Example 2

Deionized water was not added to the highly purified silicic acid solution with the silica concentration of 4.4% obtained like in the processes 1-1) and 1-2) in Example 1. Ammonia water with the concentration of 1% was added to the mixture solution to adjust the pH to 5.5. The mixture solution was kept at the room temperature for two hours for aging, and the silicic acid solution gelated to an agar-like substance.

1,000 grams of the gel was agitated with a medicine spoon, and ammonia water with the concentration of 15% was added to adjust the pH to 10.4 to soften the gel. The mixture solution was heated to 95° C., and was kept at the temperature for one hour, and was then cooled to the room temperature to obtain a sol. An average diameter of particles in the obtained sol was 44 nm when measured by the dynamic light scattering method, and a concentration of the solid phase was 4.2%.

79.68 grams of ammonia water with the concentration of 15% was added to 284.7 grams of the sol obtained by heating as described above to adjust the pH to 11.4, and the solution was heated to 83° C. and was kept at the temperature for 30 minutes. Then, like in Example 1, 4,333 grams of the highly purified silicic acid solution (with the silica concentration of 3% by weight) was added to the mixture solution over 18 hours. After addition was completed, the solution was kept at 83° C. for one hour, and was then cooled to the room temperature.

The mixture solution was condensed by ultra-condensation and by using rotary evaporator like in 1-6) and 1-7) in Example 1, and the physical properties were measured. The average diameter (r) of particles in the sol finally obtained was 53 nm. The specific surface area was 144 m²/g, the average particle diameter (r') calculated as that of an equivalent sphere based on the specific surface area was 18.9 nm, and the association ratio (r/r') was 2.8.

Comparative Example 3

Deionized water was not added to the highly purified silicic acid solution with the silica concentration of 4.7% obtained like in the processes 1-1) in Example 1. Ammonia water with the concentration of 1% was added to the mixture solution to adjust the pH to 4.5. The mixture solution was kept at the room temperature for two hours for aging, and the silicic acid solution gelated to an agar-like substance.

1,000 grams of the gel was agitated with a medicine spoon, and ammonia water with the concentration of 15% was added to adjust the pH to 10.4 to soften the gel. The mixture solution was heated to 95° C., and was kept at the temperature for one hour, and was then cooled to the room temperature to obtain a sol. An average diameter of particles in the obtained sol was 56 nm when measured by the dynamic light scattering method, and a concentration of the solid phase was 1.9%.

20.81 grams of water glass No. 3 with the silica concentration of 24.25% was added to 284.7 grams of the sol obtained by heating as described above to adjust the pH to 11.2. The mixture solution was heated to 83° C. and kept at the temperature for 30 minutes. Deionized water was added to the silicic acid solution (with the silica concentration of 4.7%) produced in the production method as that described in 1-1) in Example 1 to adjust the silica concentration to 3%, and 4.333 grams of the silicic acid solution was added to the mixture solution described above over 18 hours. After addition was completed, the resultant mixture solution was kept at 83° C. for one hour and then was cooled to the room temperature.

The mixture solution was condensed by ultra-condensation (with the silica concentration of 12%) and, by using rotary evaporator (with the silica concentration of 30.5%) like in 1-6) and 1-7) in Example 1, the physical properties were measured. The average diameter (r) of particles in the sol finally obtained was 65 nm. The specific surface area was 124 m²/g, the average particle diameter (r') calculated as that of an equivalent sphere based on the specific surface area was 22.0 nm, and the association ratio (r/r') was 2.96.

Comparative Example 4

A spherical silica sol (produced by Catalysts & Chemicals Industries Co., Ltd., Cataloid S1-50, average particle diameter measured by dynamic light scattering method: 38 nm, silica concentration: 48%, association ratio: 1.5) was prepared. Ultra pure water was added to the spherical silica sol to adjust the silica concentration to 16%, and then a slurry was prepared for use in the polishing performance test in Example 11.

Comparative Example 5

A spherical silica sol (produced by Catalysts & Chemicals Industries Co., Ltd., Cataloid SI-80, average particle diameter measured by dynamic light scattering method: 105 nm, silica concentration: 40.5%, association ratio: 1.3) was prepared. Ultra pure water was added to the spherical silica sol to adjust the silica concentration to 16%, and then a slurry was prepared for use in the polishing performance test in Example 12.

Example 10

[Testing for Adaptability to Filtration]
The silica sols obtained in Examples 1 to 9 and Comparative Examples 1 to 3 and also the silica sol prepared in Comparative Examples 4, 5 were filtered with a 0.45μ-meshed flat plate filter with a diameter of 47 mm, and weights of sols having passed through the filters were measured. A result of the assessment is shown in Table 2.

Example 11

[Testing of Aluminum Substrate for Polishing Performance]
Preparation of Slurry for Polishing
$H_2O_2$, HEDP (1-hydroxyethylidene-1,1-diphosphonic acid), and ultra-pure water were added to the nodular silica sols with the silica concentration of 16% by weight obtained in Examples 1 to 9 above to prepare a slurry for polishing containing silica by 9% by weight, $H_2O_2$ by 0.5% by weight, and 1-hydroxyethylidene-1,1-diphosphonic acid by 0.5% by weight, and $HNO_3$ was added to the mixture, according to the necessity, to prepare a slurry for polishing with the pH of 2.0.

The silica sols obtained in Comparative Examples 1 to 3 and the spherical silica sol obtained in Comparative Example 4 were processed similarly to obtain slurries for polishing.
Polished Substrate A substrate for an aluminum disk was used as a substrate to be polished.

This substrate for an aluminum disk was prepared by electroless deposition of Ni—P with the thickness of 10 μm (hard Ni—P plating layer with the Ni content of 88% and P content of 12%) on an aluminum substrate (95 mmφ/25 mmφ-1.27 mm t). This substrate was preliminarily polished, and the surface roughness was at maximum 0.17 μm.
Polishing Test The substrate to be polished was set on a polishing device (produced by Nano Factor Co.: NF300), and was polished at the substrate load of 0.05 MPa and table rotation speed of 30 rpm using "Apolon" produced by Rodeil Corp. as a polishing pad and feeding the slurry for polishing at the rate of 20 g/min for 10 minutes.

A change between a weight of the substrate before polishing and that after polishing was obtained, and the polishing speed was calculated. Ratios of the polishing speeds in Examples 1 to 9 and in Comparative Examples 1 to 3 are shown in Table 2 assuming that the polishing speed in Comparative Example 4 is 1.

The polished surfaces were observed and also smoothness of each surface was visually checked with an optical microscope. A result of observation is shown in Table 2.
No scratches recognized: ◎
Small scratches recognized a little: ○
Small scratches recognized in a wide area: Δ
Large scratches recognized at some points: ×

Example 12

[Testing for Polishing Characteristics of Glass Substrate]
Preparation of Slurry for Polishing
An aqueous solution of sodium hydroxide with the concentration of 5% and ultra-pure water were added to the nodular silica sols with the silica concentration of 16% by weight obtained in Examples 1 to 9 above to prepare slurries for polishing each with the silica concentration of 9% by weight and the pH of 10.5. The silica sols obtained in Comparative Examples 1 to 3 and the spherical silica sol obtained in Comparative Example 5 were processed similarly to obtain slurries for polishing.

Polished Substrate

A glass substrate for a hard disk made from reinforced glass with the thickness of 65 mmφ as used as a substrate to be polished. This glass substrate for a hard disk was preliminarily polished, and the surface roughness was at maximum 0.21 μm.

Polishing Test

The substrate to be polished was set on a polishing device (produced by Nano Factor K.K.: NF300), and was polished at the substrate load of 0.18 MPa and table rotation speed of 30 rpm using "Apolon" produced by Rodeil Corp. as a polishing pad and feeding the slurry for polishing at the rate of 20 g/m for 10 minutes.

A change between a weight of the substrate before polishing and that after polishing was obtained, and the polishing speed was calculated. Ratios of the polishing speeds in Examples 1 to 9 and in Comparative Examples 1 to 3 are shown in Table 2 assuming that the polishing speed in Comparative Example 5 is 1.

The polished surfaces were observed and also smoothness of each surface was visually checked with an optical microscope. A result of observation is shown in Table 1.

No scratches recognized: ◉
Small scratches recognized a little: ○
Small scratches recognized in a wide area: Δ
Large scratches recognized at some points: ×

TABLE 1

| | pH adjust of silicic acid soln. | | | | Aging | | | Seed soln. | | | Build-up Silicic acid solution | | |
|---|---|---|---|---|---|---|---|---|---|---|---|---|---|
| | High purifying | Silica conc. wt % | pH adjusting agent | After adjust pH | Temp. °C. | Time hr | Visc. mPa·s | Particle diameter nm | Alkali | After add pH | Temp. °C. | High purifying | Silica conc. (wt %) | Time (hr) |
| Ex. 1 | Performed | 2 | 1%-NH₄OH | 4.5 | Room | 2 | 1.3 | 20 | 15%-NH₄OH | 11.4 | 83 | Performed | 3 | 18 |
| Ex. 2 | Performed | 2 | None | 3.8 | Room | 2 | 1.1 | 16 | 15%-NH₄OH | 11.4 | 83 | Performed | 3 | 18 |
| Ex. 3 | Performed | 2 | 1%-NH₄OH | 4.5 | 80 | 1 | 1.3 | 33 | 15%-NH₄OH | 11.4 | 83 | Performed | 3 | 18 |
| Ex. 4 | Performed | 2 | 1%-NH₄OH | 4.5 | 5 | 2 | 1.1 | 12 | 15%-NH₄OH | 11.4 | 83 | Performed | 3 | 18 |
| Ex. 5 | Performed | 2 | 1%-NH₄OH | 6.5 | Room | 2 | 1.3 | 13 | 15%-NH₄OH | 11.4 | 83 | Performed | 3 | 18 |
| Ex. 6 | Performed | 2 | 1%-H₂SO₄ | 2.0 | Room | 2 | 1.2 | 18 | 15%-NH₄OH | 11.4 | 83 | Performed | 3 | 18 |
| Ex. 7 | Performed | 2 | 1%-H₂SO₄ | 3.0 | Room | 72 | 78.0 | 60.4 | 15%-NH₄OH | 11.4 | 83 | Performed | 3 | 18 |
| Ex. 8 | None | 2 | 1%-NH₄OH | 4.5 | 40 | 2 | 1.3 | 27 | Water glass | 11.2 | 83 | None | 3 | 18 |
| Ex. 9 | None | 2 | 1%-NH₄OH | 4.5 | 40 | 2 | 1.3 | 25 | Water glass | 11.2 | 83 | None | 3 | 18 |
| Comp. 1 | Performed | 4.4 | 1%-NH₄OH | 4.5 | Room | 2 | Gelation | 53 | 15%-NH₄OH | 11.4 | 83 | Performed | 3 | 18 |
| Comp. 2 | Performed | 4.4 | 1%-NH₄OH | 5.5 | Room | 2 | Gelation | 44 | 15%-NH₄OH | 11.4 | 83 | Performed | 3 | 18 |
| Comp. 3 | None | 4.7 | 1%-NH₄OH | 4.5 | Room | 2 | Gelation | 56 | Water glass | 11.2 | 83 | None | 3 | 18 |
| Comp. 4 | — | — | — | — | — | — | — | — | — | — | — | — | — | — |
| Comp. 5 | — | — | — | — | — | — | — | — | — | — | — | — | — | — |

TABLE 2

| | Physical properties of silica sol | | | | | | | | Polishing characteristics | | | | | | | | |
|---|---|---|---|---|---|---|---|---|---|---|---|---|---|---|---|---|---|
| | | | | | | | | | Filter passing g | Aluminum substrate | | Glass substrate | | Contents | | | | | |
| | r nm | SA m²/g | r' nm | r/r' | Silica conc. wt % | Na ppm | K ppm | Cl ppm | | Polishing rate | Scratch | Polishing rate | Scratch | Mg (MgO) ppm | Ca (CaO) ppm | C mass % | Cu ppb | Ni ppb | Fe ppm |
| Ex. 1 | 37 | 118 | 23.1 | 16.0 | 16.0 | ≤1 | ≤1 | ≤1 | ≥100 | 1.4 | ○ | 1.3 | ◉ | 6 | 3 | ≤0.01 | 150 | 30 | 8 |
| Ex. 2 | 32 | 137 | 19.9 | 1.61 | 16.0 | ≤1 | ≤1 | ≤1 | ≥100 | 1.3 | ○ | 1.2 | ◉ | 3 | 5 | ≤0.01 | 180 | 80 | 9 |
| Ex. 3 | 62 | 102 | 26.7 | 2.32 | 16.0 | ≤1 | ≤1 | ≤1 | ≥100 | 1.6 | ◉ | 1.5 | ◉ | 5 | 6 | ≤0.01 | 140 | 60 | 8 |

TABLE 2-continued

| | | Physical properties of silica sol | | | | | | | Polishing characteristics | | | | | | | | | |
|---|---|---|---|---|---|---|---|---|---|---|---|---|---|---|---|---|---|---|
| | | | | | | | | | | Aluminum substrate | | Glass substrate | | | | | | | |
| | | | | | | | | | Filter | Po- | | Po- | | | Contents | | | | |
| | | | | | Silica | | | | pass- | lish- | | lish- | | Mg | Ca | C | | | |
| | r | SA | r' | | conc. | Na | K | Cl | ing | ing | | ing | | (MgO) | (CaO) | mass | Cu | Ni | Fe |
| | nm | m²/g | nm | r/r' | wt % | ppm | ppm | ppm | g | rate | Scratch | rate | Scratch | ppm | ppm | % | ppb | ppb | ppm |
| Ex. 4 | 27 | 157 | 17.4 | 1.55 | 16.0 | ≤1 | ≤1 | ≤1 | ≥100 | 1.3 | Δ | 1.1 | ◎ | 8 | 2 | ≤0.01 | 120 | 60 | 8 |
| Ex. 5 | 32 | 139 | 19.6 | 1.63 | 160 | ≤1 | ≤1 | ≤1 | ≥100 | 1.3 | ○ | 1.2 | ◎ | 9 | 8 | ≤0.01 | 180 | 40 | 7 |
| Ex. 6 | 34 | 128 | 21.3 | 1.60 | 16.0 | ≤1 | ≤1 | ≤1 | ≥100 | 1.3 | ○ | 1.2 | ◎ | 6 | 4 | ≤0.01 | 140 | 80 | 9 |
| Ex. 7 | 80 | 89 | 30.6 | 2.61 | 16.0 | ≤1 | ≤1 | ≤1 | 58 | 1.7 | ◎ | 1.7 | ◎ | 5 | 6 | ≤0.01 | 140 | 80 | 8 |
| Ex. 8 | 53 | 112 | 24.3 | 2.18 | 30.5 | 0.30% | 10 | 540 | ≥100 | 1.6 | ◎ | 1.5 | ◎ | 11 | 8 | ≤0.01 | 260 | 80 | 13 |
| Ex. 9 | 35 | 195 | 14 | 2.5 | 30.5 | 0.30% | 10 | 540 | ≥100 | 1.3 | ○ | 1.2 | ◎ | 10 | 8 | ≤0.01 | 220 | 80 | 9 |
| Comp. 1 | 68 | 125 | 21.8 | 3.12 | 16.0 | ≤1 | ≤1 | ≤1 | 18 | 1.6 | x | 1.6 | ◎ | — | — | — | — | — | — |
| Comp. 2 | 51 | 144 | 18.9 | 2.80 | 16.0 | ≤1 | ≤1 | ≤1 | 20 | 1.5 | x | 1.5 | ◎ | — | — | — | — | — | — |
| Comp. 3 | 65 | 124 | 22.0 | 2.96 | 30.5 | 0.30% | 10 | 540 | 21 | 1.6 | x | 1.6 | ◎ | — | — | — | — | — | — |
| Comp. 4 | — | — | — | — | — | — | — | — | 65 | 1.0 | ◎ | — | — | — | — | — | — | — | — |
| Comp. 5 | — | — | — | — | — | — | — | — | 75 | — | — | 1 | ◎ | — | — | — | — | — | — |

Example 13

An aqueous solution of sodium silicate with the $SiO_2$ concentration of 24% by weight (molar ration of $SiO_2/Na_2O$: 3.1) was diluted with ion-exchanged water to prepare 1 kg of sodium-silicate aqueous solution with the $SiO_2$ concentration of 5% by weight (pH: 11.3).

This sodium silicate aqueous solution was neutralized with sulfuric acid to adjust the pH to 6.5 and was kept at the room temperature for one hour to prepare a silica hydrogel. This hydrogel was sufficiently cleaned with deionized water (at an amount equivalent to about 120 times of the solid phase $SiO_2$) and using the Oliver filter to remove salts contained therein. After cleaning, a concentration of sodium sulfate was less than 0.01% against the solid phase of $SiO_2$.

The obtained silica gel was dispersed in deionized water (with the silica concentration of 3% by weight) and was agitated with a strong agitator to obtain a hydrogel dispersion in the slurry state having fluidity, and an aqueous solution of NaOH with the concentration of 5% by weight was added to adjust the $SiO_2/Na_2O$ molar ratio to 75 and was heated at 160° C. for one hour for aging. The conditions for preparation in the process (1) are as shown in Table 3.

0.81 Kg of sodium silicate with the concentration of 24% and 10.93 Kg of deionized water were added to 2.09 Kg of the silica sol described above to prepare 13.83 Kg of seed sol (with the pH of 11.2). The average diameter of particles in the seed sol was 17 nm when measured by the dynamic light scattering method. Measurement of an average diameter of particles in the seed sol was performed also in the examples and comparative examples described below. A result is shown in Table 4.

The seed sol was kept at 83° C. and 175.8 Kg of a silicic acid solution with the concentration of 3% by weight described below was added to the seed sol over 14 hours.

After addition was completed, the mixture solution was cooled to the room temperature, and the obtained nodular silica sol was condensed with a ultra-filtration film to the $SiO_2$ concentration of 20% by weight.

Using the nodular silica sol as a sample, an average particle diameter (r) was measured by the dynamic light scattering method and an average particle diameter (r') calculated from a specific surface area measured by the BET method. Also the zeta potential was measured at the pH 5 and pH 9. A result of the measurement and conditions for preparation in the process (2) are as shown in Table 4. Measurement of r, r', and zeta potential was performed also in the examples and comparative examples described below.

Preparation of a Silicic Acid Solution 0.8 Kg of sodium silicate (water glass No. 3) with the silica concentration of 24% was passed through a ultra-filtration module (produced by Asahi Kasei Corp.: SIP1013), and the filtrate was recovered to obtain refined water glass. Deionized water was added to the obtained refined water glass to adjust the silica concentration to 3.2%. 6,500 grams of the diluted water glass was passed through 2.2 litters of the strong acidic cation exchange resin SK1BH (produced by Mitsubishi kagaku) at the velocity of 3 L/hour to obtain 6,650 grams of acidic silicic acid solution. The silica concentration of the obtained silicic acid solution was 3.0%.

Also in the examples and comparative examples described below, the silicic acid solution obtained by the production method as described above was used after the concentration was adjusted. A result of analysis in Examples 13 to 23 is shown in Table 4.

The average particle diameter (r) of Examples 13 to 23 and Comparative Examples 6 to 10 measured by means of the dynamic light scattering method is measured by the particle diameter distribution measuring device (produced by Particle Sizing Systems Corp., NICOMP MODEL 380) using a laser beam.

Example 14

A nodular silica sol was prepared in the same way like that in Example 13 excluding the points that an ammonia water aqueous solution with the concentration of 28% was used in place of deionized water for cleaning, that a mixture of an aqueous solution of NaOH with the concentration of 5% by weight and ammonia water with the concentration of 28% (1:1) was added to the silica hydrogel in place of the NaOH aqueous solution with the concentration of 5% by weight, that the temperature was set to 90° C. at a build-up step, that the silica concentration of the added solution was 4.5% by weight, that an amount of added silicic acid solution was 117.2 Kg, and that the addition of the silicic acid solution was performed over 10 hours.

Example 15

A nodular silica sol was prepared in the same way as that in Example 13 excluding the point that the temperature was set to 88° C. in building up.

Example 16

A nodular silica sol was prepared in the same way as that in Example 13 excluding the point that hydrochloric acid was used in place of sulfuric acid for preparing a silica hydrosol and the temperature for building up was set to 85° C.

Example 17

A nodular silica sol was prepared in the same way as that in Example 13 excluding the point that the silica concentration of the added silicic acid solution was 4.5% by weight and an amount of the added silicic acid solution was 117.2 Kg.

Example 18

A nodular silica sol was prepared in the same way as that in Example 13 excluding the point that the amount of added silicic acid solution was 126.7 Kg.

Example 19

A nodular silica sol was prepared in the same way as that in Example 13 excluding the point that the silicic acid solution was added during the build-up process over 13 hours.

Example 20

A nodular silica sol was prepared in the same way as that in Example 13 excluding the point that the temperature during the build-up process was set to 86° C.

Example 21

A nodular silica sol was prepared in the same way as that in Example 13 excluding the point that the temperature during the build-up process was set to 87° C.

Example 22

A nodular silica sol was prepared in the same way as that in Example 13 excluding the point that aging after aging after the NaOH aqueous solution with the concentration of 5% by weight was performed at 120° C. for two hours, and the temperature during the build-up process was set to 70° C.

Example 23

A nodular silica sol was prepared in the same way as that in Example 22 excluding the point that the temperature during the build-up process was set to 120° C.

Comparative Example 6

A nodular silica sol was prepared in the same way as that in Example 13 excluding the point that the temperature during the build-up process was set to 40° C.

Comparative Example 7

A silica concentration of the spherical silica sol having the average particle diameter of 17 nm (Cataloid SI-40, produced by Catalysts & Chemicals Industries Co., Ltd.) was adjusted to 4.5% by weight, and 13.83 Kg of the spherical silica sol was used as a seed sol. 0.81 Kg of sodium silicate with the $SiO_2$ concentration of 24% was added to the seed sol like in Example 13, and the mixture was well agitated. The seed sol was kept at 85° C., and 175.8 Kg of silicic acid solution (with the $SiO_2$ of 3% by weight) was added to the seed sol over 14 hours.

After addition was completed, the seed sol was cooled to the room temperature, and the obtained silica sol was condensed with a ultra-filtration film to the $SiO_2$ concentration of 10% by weight.

Comparative Example 8

A proper quantity of NaOH aqueous solution with the concentration of 5% by weight was added to the hydrogel dispersion to adjust the $SiO_2/NaO_2$ molar ratio to 25. A silica sol was prepared in the same way as that in Example 13 excluding the points that sodium silicate was not added to the seed sol, that the amount of the seed sol was 13.02 Kg, that the amount of the added silicic acid solution was 182.0 Kg, and the addition of silicic acid solution was performed over 14.5 hours.

Comparative Example 9

A silica sol was prepared in the same way as that in Example 13 excluding the point that the temperature for heating after addition of the NaOH aqueous solution with the concentration of 5% by weight was set to 250° C.

Comparative Example 10

A silica sol was prepared in the same way as that in Example 13 excluding the points that a proper amount of NaOH aqueous solution with the concentration of 5% by weight was added to the silica sol dispersion to adjust the $SiO_2/NaO_2$ molar ratio to 550, that sodium silicate added to the seed sol was not added to the seed sol, that the amount of seed sol was 13.02 Kg, that the amount of added silicic acid solution was 182.0 Kg, and that addition of the silicic acid solution was performed over 14.5 hours.

TABLE 3

| | Step (1) | | | | | | | | | |
|---|---|---|---|---|---|---|---|---|---|---|
| | Silicate solution | | | Add of acid | | | Deflocculation by alkali | | | |
| | | Silica | | | After | | | | | |
| | Amount Kg | conc. % | pH | Acid | add pH | Washing | Alkali | SiO₂/M₂O Molar ratio | pH | Temp. °C. | Time hr |
| Ex. 13 | 1 | 5 | 11.3 | H₂SO₄ | 6.5 | H₂O | NaOH | 75 | 10.5 | 160 | 1 |
| Ex. 14 | 1 | 5 | 11.3 | H₂SO₄ | 6.5 | NH₄OH | NH₄OH + NaOH | 75 | 10.3 | 160 | 1 |
| Ex. 15 | 1 | 5 | 11.3 | H₂SO₄ | 6.5 | H₂O | NaOH | 75 | 10.5 | 160 | 1 |
| Ex. 16 | 1 | 5 | 11.3 | HCl | 6.5 | H₂O | NaOH | 75 | 10.5 | 160 | 1 |
| Ex. 17 | 1 | 5 | 11.3 | H₂SO₄ | 6.5 | H₂O | NaOH | 75 | 10.5 | 160 | 1 |
| Ex. 18 | 1 | 5 | 11.3 | H₂SO₄ | 6.5 | H₂O | NaOH | 75 | 10.5 | 160 | 1 |
| Ex. 19 | 1 | 5 | 11.3 | H₂SO₄ | 6.5 | H₂O | NaOH | 75 | 10.5 | 160 | 1 |
| Ex. 20 | 1 | 5 | 11.3 | H₂SO₄ | 6.5 | H₂O | NaOH | 75 | 10.5 | 160 | 1 |
| Ex. 21 | 1 | 5 | 11.3 | H₂SO₄ | 6.5 | H₂O | NaOH | 75 | 10.5 | 160 | 1 |
| Ex. 22 | 1 | 5 | 11.3 | H₂SO₄ | 6.5 | H₂O | NaOH | 75 | 10.5 | 120 | 2 |
| Ex. 23 | 1 | 5 | 11.3 | H₂SO₄ | 6.5 | H₂O | NaOH | 75 | 10.5 | 160 | 2 |
| Comp. 6 | 1 | 5 | 11.3 | H₂SO₄ | 6.5 | H₂O | NaOH | 75 | 10.5 | 160 | 1 |
| Comp. 7 | None | None | None | None | None | None | None | None | None | None | None |
| Comp. 8 | 1 | 5 | 11.3 | H₂SO₄ | 6.5 | H₂O | NaOH | 25 | 10.8 | 160 | 1 |
| Comp. 9 | 1 | 5 | 11.3 | H₂SO₄ | 6.5 | H₂O | NaOH | 75 | 10.5 | 250 | 1 |
| Comp. 10 | 1 | 5 | 11.3 | H₂SO₄ | 6.5 | H₂O | NaOH | 550 | 4.5 | 160 | 1 |

TABLE 4

| | Step (2) | | | | | | | | | | | | | | | | |
|---|---|---|---|---|---|---|---|---|---|---|---|---|---|---|---|---|---|
| | Preparation | | | Seed sol | | | | Build-up | | | | Silica sol | | | | | |
| | | | | | | | | | Silicic acid soln. | | | Zeta poten- | | Silica particles | | | |
| | Water Kg | Silica sol (1) Kg | Sodium silicate Kg | Silica conc. % | Amount Kg | Particle diameter nm | pH | Temp. °C. | Conc % | Amount Kg | Time hr | r nm | r' nm | r/r' | tial diff. mV | SA m²/g | Mg (MgO) ppm | Ca (CaO) ppm | C mass % |
| Ex. 13 | 10.93 | 2.09 | 0.81 | 4.5 | 13.83 | 17 | 11 | 83 | 3 | 175.8 | 14 | 40 | 31 | 1.29 | 5 | 88 | ≤100 | ≤100 | ≤0.01 |
| Ex. 14 | 10.93 | 2.09 | 0.81 | 4.5 | 13.83 | 17 | 11 | 90 | 4 | 117.2 | 10 | 50 | 40 | 1.25 | 9 | 68 | ≤100 | ≤100 | ≤0.01 |
| Ex. 15 | 10.93 | 2.09 | 0.81 | 4.5 | 13.83 | 17 | 11 | 88 | 3 | 175.8 | 14 | 40 | 33 | 1.23 | 4 | 83 | ≤100 | ≤100 | ≤0.01 |
| Ex. 16 | 10.93 | 2.09 | 0.81 | 4.5 | 13.83 | 17 | 11 | 85 | 3 | 175.8 | 14 | 38 | 32 | 1.21 | 9 | 85 | ≤100 | ≤100 | ≤0.01 |
| Ex. 17 | 10.93 | 2.09 | 0.81 | 4.5 | 13.83 | 17 | 11 | 83 | 4.5 | 117.2 | 14 | 48 | 22 | 2.18 | 4 | 124 | ≤100 | ≤100 | ≤0.01 |
| Ex. 18 | 10.93 | 2.09 | 0.81 | 4.5 | 13.83 | 17 | 11 | 83 | 3 | 126.7 | 14 | 35 | 27 | 1.30 | 6 | 101 | ≤100 | ≤100 | ≤0.01 |
| Ex. 19 | 10.93 | 2.09 | 0.81 | 4.5 | 13.83 | 17 | 11 | 83 | 3 | 175.8 | 13 | 32 | 26 | 1.23 | 7 | 105 | ≤100 | ≤100 | ≤0.01 |
| Ex. 20 | 10.93 | 2.09 | 0.81 | 4.5 | 13.83 | 17 | 11 | 86 | 3 | 175.8 | 14 | 41 | 14 | 2.93 | 3 | 195 | ≤100 | ≤100 | ≤0.01 |
| Ex. 21 | 10.93 | 2.09 | 0.81 | 4.5 | 13.83 | 17 | 11 | 87 | 3 | 175.8 | 14 | 45 | 37 | 1.22 | 7 | 74 | ≤100 | ≤100 | ≤0.01 |
| Ex. 22 | 10.93 | 2.09 | 0.81 | 4.5 | 13.83 | 12 | 11 | 70 | 3 | 175.8 | 14 | 32 | 13 | 2.46 | 3 | 210 | ≤100 | ≤100 | ≤0.01 |
| Ex. 23 | 10.93 | 2.09 | 0.81 | 4.5 | 13.83 | 17 | 11 | 120 | 3 | 175.8 | 14 | 65 | 53 | 1.22 | 9 | 51 | ≤100 | ≤100 | ≤0.01 |
| Comp. 6 | 10.93 | 2.09 | 0.81 | 4.5 | 13.83 | 17 | 11 | 40 | 3 | 175.8 | 14 | Gelation | — | — | — | — | — | — | — |
| Comp. 7 | 10.93 | 2.09 | 0.81 | 4.5 (spherical 17 nm) | 13.83 | 17 | 11 | 83 | 3 | 175.8 | 14 | 44 | 39 | 1.13 | 13 | — | — | — | — |
| Comp. 8 | 10.93 | 2.09 | 0 | 4.5 | 13.02 | 17 | 11.0 | 83 | 3 | 182 | 14.5 | Gelation | — | — | — | — | — | — | — |

TABLE 4-continued

| | | Step (2) | | | | | | | | | | | | | | | | |
|---|---|---|---|---|---|---|---|---|---|---|---|---|---|---|---|---|---|---|
| | Preparation | | Seed sol | | | | Silica sol | | | | | | | | | | | |
| | | Sil-ica sol (1) | Sodium sil-icate | Sil-ica conc. | Par-ticle | | | Build-up | | | | | | Zeta poten- | | Silica particles | | |
| | | | | | | | | Silicic acid soln. | | | | | | | | | | |
| | Water Kg | Kg | Kg | % | A-mount Kg | diam-eter nm | pH | Temp. °C. | Conc % | A-mount Kg | Time hr | r nm | r' nm | r/r' | tial diff. mV | SA m²/g | Mg (MgO) ppm | Ca (CaO) ppm | C mass % |
| Comp. 9 | 10.93 | 2.09 | 0.81 | 4.5 | 13.83 | 20 | 11 | 83 | 3 | 175.8 | 14 | 45 | 41 | 1.10 | 13 | — | — | — | — |
| Comp. 10 | 10.93 | 2.09 | 0 | 4.5 | 13.02 | 17 | 11.0 | 83 | 3 | 182 | 14.5 | Gela-tion | — | — | — | — | — | — | — |

The invention claimed is:

1. A method of producing a nodular silica sol, comprising the steps of:
preparing a polymerized silicic acid solution with viscosity of a silicic acid in a range from 0.9 to 100 mPa-s by aging a silicic acid solution with pH in a range from 1.0 to 7.0 and silica concentration in a range from 0.05 to 3.0% by weight at a temperature in a range from 1 to 98° C.;
preparing a seed liquid by adding an alkali to the polymerized solution to adjust the pH to a range from 10 to 12.5 and heating the resultant mixture solution at a temperature in a range from 50 to 150° C.;
adding an alkali, according to the necessity, to the obtained seed liquid to adjust the pH in a range from 9 to 12.5;
dropping a silicic acid solution or a highly purified silicic acid solution to the seed liquid at a temperature in a range from 20 to 98° C. continuously or intermittently for building up; and
condensing a mixture of the acid solution and the seed liquid,
so that the nodular silica sol has characteristics such that a ratio of an average particle diameter (r) obtained through measurement by means of a dynamic light scattering method versus a particle diameter (r') converted to that of an equivalent sphere computed from an average specific surface area measured by a nitrogen absorption method (r/r', referred to as "association ratio") is in a range from 1.2 to 10, the particle diameter (r') is in a range from 5 to 200 nm, a specific surface area is in a range from 13 to 550 m²/g, and contents of Ca and Mg calculated as those of oxides contained in the nodular silica particles are below 100 ppm against SiO₂ respectively.

2. The method of producing a nodular silica sol according to claim 1, wherein the pH of the silicic acid solution is adjusted to a range from 1.0 to 7.0 by adding an alkali or an acid to the silicic acid solution.

3. The method of a nodular silica sol according to claim 1, wherein the highly purified silicic acid solution is highly purified by contacting a strong acidic cation exchanger or a strong basic anion exchanger separately to a silicic acid solution.

4. The method of producing the nodular silica sol according to claim 1, wherein the nodular silica sol is further highly purified.

5. The method of producing a nodular silica sol according to claim 4, wherein, in a process for highly purifying the nodular silica sol, the nodular silica sol is contacted to a cation exchanger, and furthermore to an anion exchanger.

6. A method of producing a nodular silica sol, comprising the steps of:
(1) cleaning a silica hydrogel obtained by neutralizing a silicate with an acid to remove salts, adding an alkali to adjust molar ratio of $SiO_2/M_2O$ (M: Na, K, $NH_3$) to a range from 30 to 500, and heating the mixture at a temperature in a range from 60 to 200° C. to obtain a silica sol;
(2) using the silica sol as a seed sol, adding an alkali according to the necessity to adjust pH to a range from 9 to 12.5, and adding a silicic acid solution to the seed sol at a temperature in a range from 60 to 200° C. continuously or intermittently; and
(3) cooling and condensing a mixture of the acid solution and the seed sol, so that the nodular silica sol has characteristics such that a ratio of an average particle diameter (r) obtained through measurement by means of a dynamic light scattering method versus a particle diameter (r') converted to that of an equivalent sphere computed from an average specific surface area measured by a nitrogen absorption method (r/r', referred to as "association ratio") is in a range from 1.2 to 10, the particle diameter (r') is in a range from 5 to 200 nm, a specific surface area is in a range from 13 to 550 m²/g, and contents of Ca and Mg calculated as those of oxides contained in the nodular silica particles are below 100 ppm against $SiO_2$ respectively.

7. The method of producing a nodular silica sol according to claim 6, wherein the silicate is selected from a group consisting of sodium silicate, potassium silicate, and ammonium silicate.

8. The method of producing a nodular silica sol according to claim 6, wherein the seed sol in the step (2) is a sol in which silica particles having an average diameter measured by the dynamic light scattering method in a range from 5 to 80 nm are dispersed.

9. The method of producing a nodular silica sol according to claim 6, wherein the silicic acid solution used in the step (2) is an acidic silicic acid solution obtained by dealkylating an alkali silicate.

10. A method of producing the nodular silica sol according to claim 6, wherein the silicic acid solution is prepared by highly purifying a silicic acid solution.

11. A method of producing the nodular silica sol according to claim 6, wherein the nodular silica sol is furthermore highly purified.

12. The method of producing a nodular silica sol according to claim 1, further comprising spending 30 minutes to 72 hours in the dropping of the silicic acid solution or the highly purified silicic acid solution to the seed liquid.

13. The method of producing a nodular silica sol according to claim 12, further comprising heating the seed liquid for 0.5 to 12 hours at 20 to 98° C. after the dropping of the silicic acid solution or the highly purified silicic acid solution to the seed liquid.

* * * * *